United States Patent
Yoo et al.

(10) Patent No.: US 12,028,526 B2
(45) Date of Patent: Jul. 2, 2024

(54) IMAGE DECODING METHOD AND DEVICE USING RESIDUAL INFORMATION IN IMAGE CODING SYSTEM

(71) Applicant: LG ELECTRONICS INC., Seoul (KR)

(72) Inventors: Sunmi Yoo, Seoul (KR); Jin Heo, Seoul (KR); Ling Li, Seoul (KR); Jangwon Choi, Seoul (KR); Jungah Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/142,199

(22) Filed: May 2, 2023

(65) Prior Publication Data
US 2023/0276050 A1  Aug. 31, 2023

Related U.S. Application Data

(63) Continuation of application No. 17/865,959, filed on Jul. 15, 2022, now Pat. No. 11,677,952, which is a
(Continued)

(51) Int. Cl.
*H04N 19/13* (2014.01)
*H04N 19/124* (2014.01)
(Continued)

(52) U.S. Cl.
CPC .......... *H04N 19/13* (2014.11); *H04N 19/124* (2014.11); *H04N 19/136* (2014.11); *H04N 19/176* (2014.11); *H04N 19/60* (2014.11)

(58) Field of Classification Search
CPC .... H04N 19/13; H04N 19/124; H04N 19/136; H04N 19/176; H04N 19/60; H04N 19/122; H04N 19/18; H04N 19/70
(Continued)

(56) References Cited

U.S. PATENT DOCUMENTS 9,936,200 B2 * 4/2018 Sole Rojals .......... H04N 19/60
10,021,419 B2 * 7/2018 Karczewicz ......... H04N 19/136
(Continued)

*Primary Examiner* — Susan E. Torgerson
(74) *Attorney, Agent, or Firm* — Bryan Cave Leighton Paisner LLP

(57) ABSTRACT

An image decoding method includes receiving residual information including first size related information for a first residual coefficient and second size related information for a second residual coefficient, setting a Rice parameter of the first size related information and the second size related information as a specific value, deriving available binary values based on the Rice parameter, deriving binary values of the first size related information and the second size related information by decoding the first size related information and the second size related information, deriving values of the first size related information and the second size related information by comparing the binary values and the available binary values, deriving the first residual coefficient and the second residual coefficient based on the values, and reconstructing a current picture based on the first residual coefficient and the second residual coefficient.

10 Claims, 18 Drawing Sheets

Related U.S. Application Data continuation of application No. 17/169,899, filed on Feb. 8, 2021, now Pat. No. 11,528,482, which is a continuation of application No. 16/709,471, filed on Dec. 10, 2019, now Pat. No. 10,951,898.

(60) Provisional application No. 62/744,623, filed on Oct. 11, 2018.

(51) Int. Cl.
*H04N 19/136* (2014.01)
*H04N 19/176* (2014.01)
*H04N 19/60* (2014.01)

(58) Field of Classification Search
USPC ............................................. 375/240
See application file for complete search history.

(56) References Cited

U.S. PATENT DOCUMENTS 10,477,204 B2 * 11/2019 Misra ............... H04N 19/70
10,616,604 B2 * 4/2020 Zhang ............... H04N 19/124

* cited by examiner

IMAGE DECODING METHOD AND DEVICE USING RESIDUAL INFORMATION IN IMAGE CODING SYSTEM

CROSS-REFERENCE TO RELATED APPLICATIONS

This application is a continuation of U.S. patent application Ser. No. 17/865,959, filed on Jul. 15, 2022, which is a continuation of U.S. patent application Ser. No. 17/169,899 filed on Feb. 8, 2021 (now U.S. Pat. No. 11,528,482, issued on Dec. 13, 2022), which is a continuation of U.S. patent application Ser. No. 16/709,471 filed on Dec. 10, 2019 (now U.S. Pat. No. 10,951,898, issued on Mar. 16, 2021), which claims the benefit of U.S. Provisional Application No. 62/744,623, filed on Oct. 11, 2018, the contents of which are all hereby incorporated by reference herein in their entirety.

BACKGROUND OF THE DISCLOSURE

Field of the Disclosure

The present disclosure relates to an image coding technique, and more particularly, to an image decoding method and apparatus therefor using residual information in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and apparatus for improving image coding efficiency.

The present disclosure also provides a method and apparatus for improving efficiency of residual coding.

The present disclosure also provides a method and apparatus for deriving a Rice parameter which is used for binarizing information for a coefficient in residual information.

According to an embodiment of the present disclosure, it is provided an image decoding method performed by a decoding apparatus. The method includes receiving residual information including first size related information for a first residual coefficient and second size related information for a second residual coefficient of a current block, setting a Rice parameter of the first size related information and the second size related information as a specific value, deriving available binary values for the first size related information and the second size related information based on the Rice parameter, deriving a binary value of the first size related information and a binary value of the second size related information by decoding the first size related information and the second size related information, deriving values of the first size related information and the second size related information by comparing the binary values and the available binary values, deriving the first residual coefficient and the second residual coefficient based on the values of the first size related information and the second size related information, and reconstructing a current picture based on the first residual coefficient and the second residual coefficient.

According to another embodiment of the present disclosure, it is provided a decoding apparatus performing an image decoding. The decoding apparatus includes an entropy encoder for receiving residual information including first size related information for a first residual coefficient and second size related information for a second residual coefficient of a current block, setting a Rice parameter of the first size related information and the second size related information as a specific value, deriving available binary values for the first size related information and the second size related information based on the Rice parameter, deriving a binary value of the first size related information and a binary value of the second size related information by decoding the first size related information and the second size related information, deriving values of the first size related information and the second size related information by comparing the binary values and the available binary values, deriving the first residual coefficient and the second residual coefficient based on the values of the first size related information and the second size related information, and an adder for reconstructing a current picture based on the first residual coefficient and the second residual coefficient.

According to still another embodiment of the present disclosure, it is provided a video encoding method performed by an encoding apparatus. The method includes deriving a first residual coefficient and a second residual coefficient of a current block, setting a Rice parameter for the first residual coefficient and the second residual coefficient as a specific value, deriving binary values for first size related information for the first residual coefficient and second size related information for the second residual coefficient based on the Rice parameter, and generating residual information including the first size related information and the second size related information by encoding the binary values for first size related information for the first residual coefficient and second size related information.

According to still another embodiment of the present disclosure, it is provided a video encoding apparatus. The encoding apparatus includes a quantizer for deriving a first residual coefficient and a second residual coefficient of a current block, and an entropy encoder for setting a Rice parameter for the first residual coefficient and the second residual coefficient as a specific value, deriving binary values for first size related information for the first residual coefficient and second size related information for the second residual coefficient based on the Rice parameter, and generating residual information including the first size related information and the second size related information by encoding the binary values for first size related information for the first residual coefficient and second size related information.

According to the present disclosure, the overall image/video compression efficiency may be improved.

According to the present disclosure, the efficiency of residual coding may be improved.

According to the present disclosure, by considering that there is little correlation among residual coefficients of a pixel domain in which transform process is not performed, the process of deriving a rice parameter for binarizing residual coefficients may be simplified, and through this, residual coding efficiency may be improved.

DESCRIPTION OF EXEMPLARY EMBODIMENTS

Figure 1:
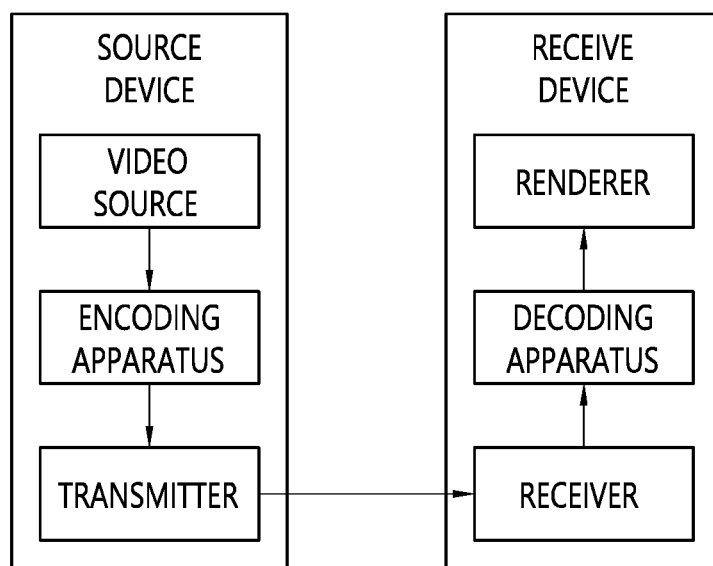
FIG. 1 briefly illustrates a video/image coding system to which the embodiments of the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates a video/image coding system to which the embodiments of the present disclosure is applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
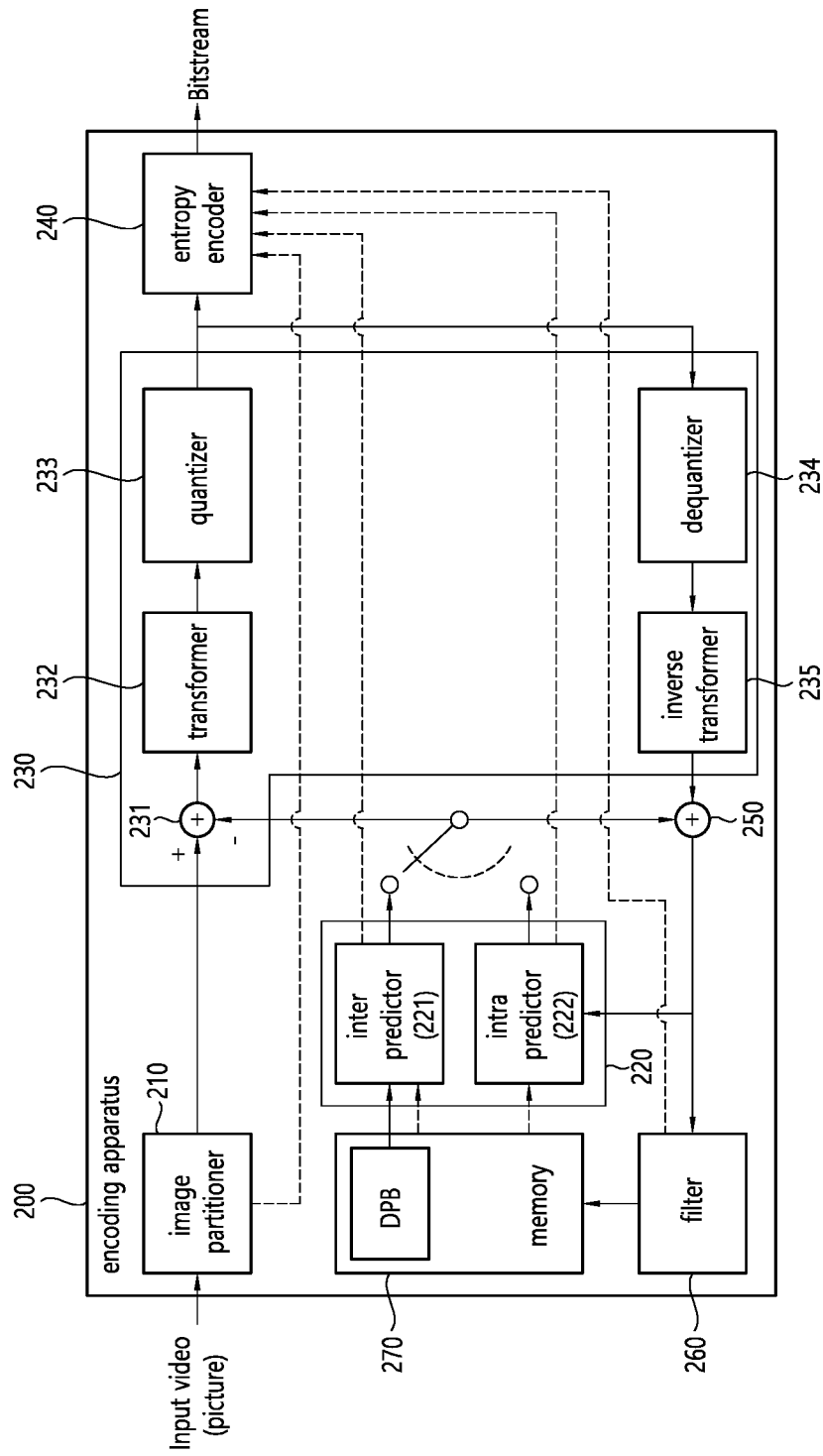
FIG. 2 is a schematic diagram illustrating a configuration of a video/image encoding apparatus to which the embodiment(s) of the present disclosure is applicable.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form.

Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
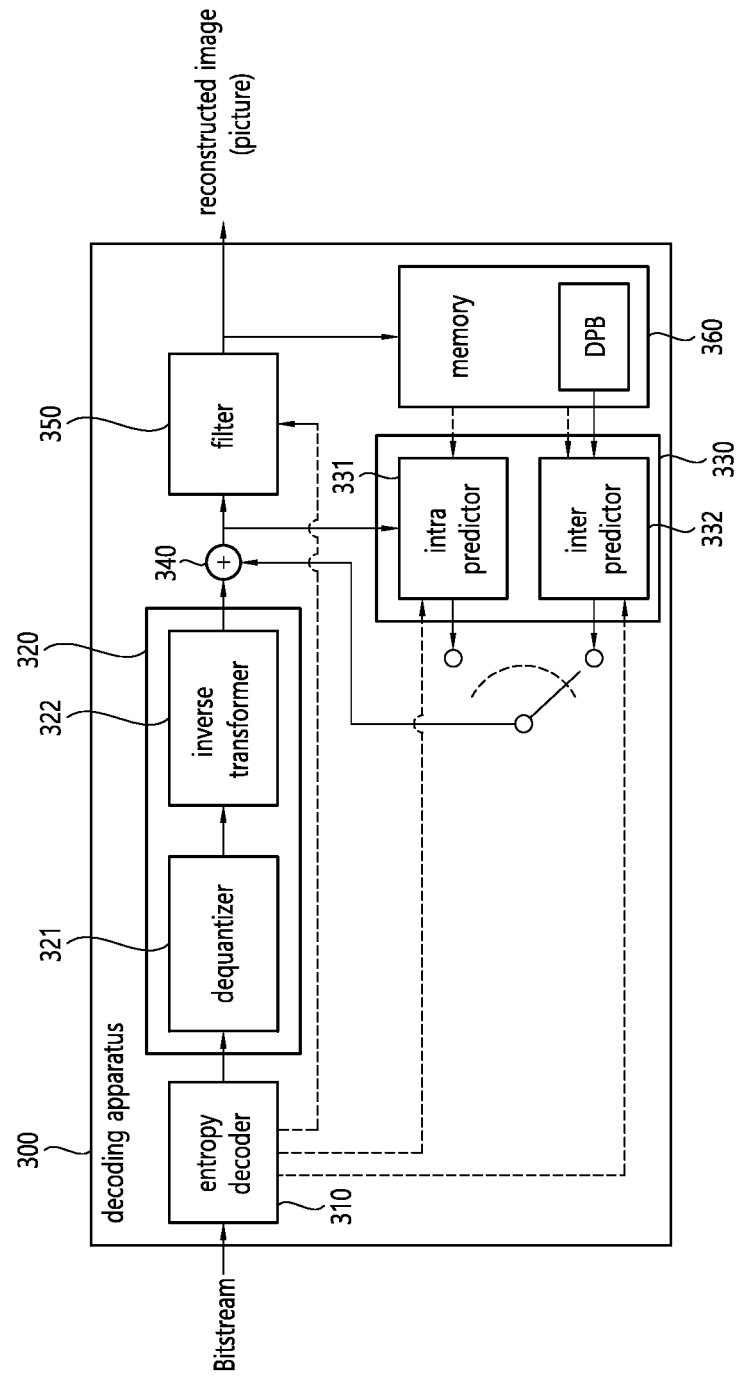
FIG. 3 is a schematic diagram illustrating a configuration of a video/image decoding apparatus to which the embodiment(s) of the present disclosure is applicable.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, the encoding apparatus may perform various encoding methods such as the exponential Golomb, the context-adaptive variable length coding (CAVLC), the context-adaptive binary arithmetic coding (CABAC), and the like. In addition, the decoding apparatus may decode information in a bitstream based on the coding methods such as the exponential Golomb, the CAVLC, the CABAC, and the like, and output the syntax element value required for reconstructing an image and the quantized values of a transform coefficient for residual.

For example, the coding methods described above may be performed as described below.

Figure 4:
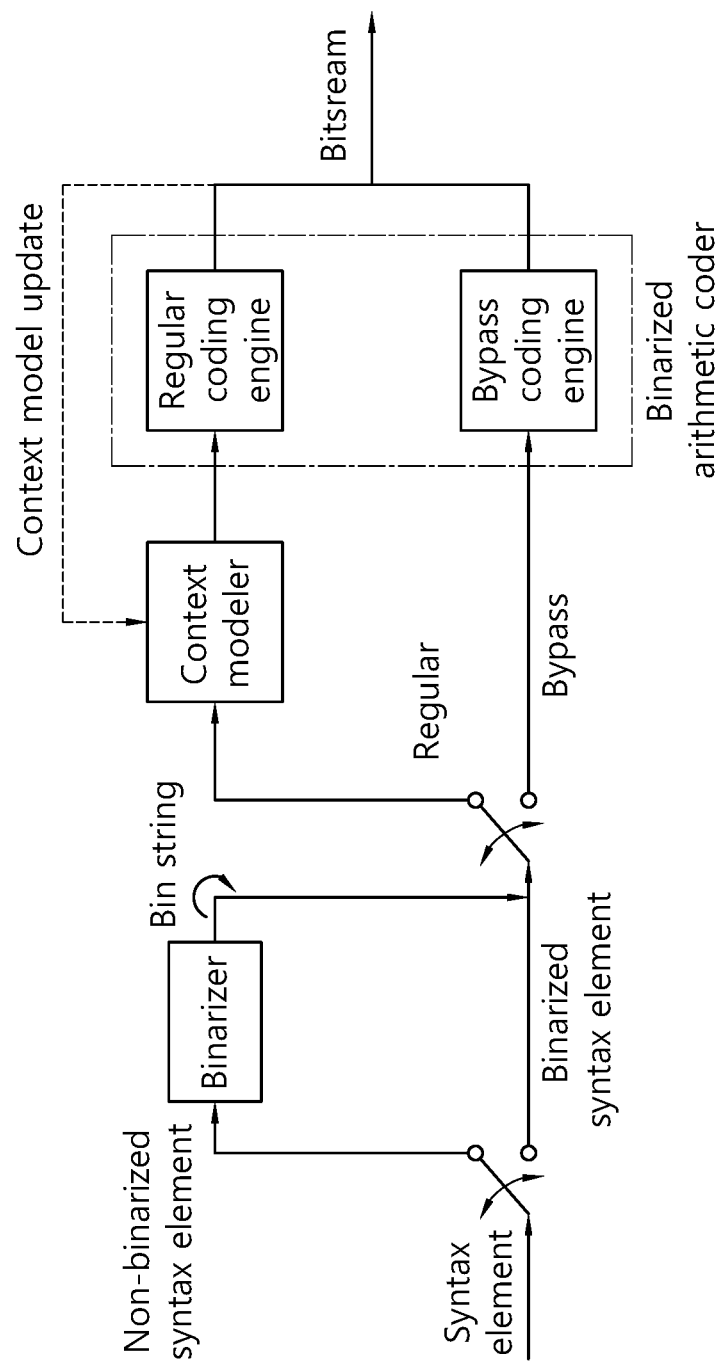
FIG. 4 illustrates the context-adaptive binary arithmetic coding (CABAC) for encoding a syntax element.

FIG. 4 illustrates the context-adaptive binary arithmetic coding (CABAC) for encoding a syntax element. For example, in the coding process of the CABAC, in the case of a syntax element of which input signal is a binary value, the encoding apparatus may transform the input signal into a binary value by binarizing the input signal value. In addition, in the case that the input signal is already a binary value (i.e., the input signal value is a binary value), the binarization is not performed, but bypassed. Here, each the binary values 0 and 1 constructing a binary value may be referred to a bin. For example, in the case that the binary string after the binarization is 110, each of 1, 1, 0 is referred to a bin. The bin(s) for a single syntax element may represent the syntax element value.

Later, the binarized bins of the syntax element may be inputted to a regular encoding engine or a bypass encoding engine. The regular encoding engine of the encoding apparatus may allocate a context model that reflects a probability value for the corresponding bin and encode the corresponding bin based on the allocated context model. The regular encoding engine of the encoding apparatus may update the context model for the corresponding bin after performing the encoding for each bin. The encoded bin described above may be referred to as a context-coded bin.

Meanwhile, in the case that the binarized bins of the syntax element is inputted to the bypass encoding engine, the binarized bins may be coded as below. For example, the bypass encoding engine of the encoding apparatus omits the process of updating the probability model applied to the bin after a process of estimating a probability for the input bin and encoding. In the case that the bypass encoding is applied, the encoding apparatus may encode the input bin by applying uniform probability distribution instead of allocating the context model, and through this, the encoding speed may be improved. The encoded bin described above may be referred to as a bypass bin.

The entropy decoding may represent a process of performing the process which is the same as the entropy encoding described above in a reverse order.

For example, in the case that a syntax element is decoded based on a context model, the decoding apparatus may receive a bin corresponding to the syntax element through a bitstream, determine a context model by using decoding information of a decoding target block or a neighboring block or information of symbol/bin which is decoded in the previous step, perform an arithmetic decoding of the bin by anticipating an occurrence probability of the received bin, and derive the syntax element value. Later, the context model of a bin decoded next may be updated to the determined context model.

In addition, for example, in the case that a syntax element is bypass-decoded, the decoding apparatus may receive the bin corresponding to the syntax element through a bitstream and decode the input bin by applying the uniform probability distribution. In this case, the decoding apparatus may omit the process of deriving the context model of the syntax element and the process of updating the context model applied to the bin.

Meanwhile, in an embodiment, (quantized) transform coefficient (i.e., residual information) may be encoded and/or decoded based on the syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, rem_abs_gt1_flag, rem_abs_gt2_flag, abs_remainder, coef_f_sign_flag, mts_idx, and the like. The syntax elements related to the encoding/decoding of residual data may be represented as the following table.

TABLE 1

| | Descriptor |
|---|---|
| residual_coding( x0, y0, log2TbWidth, log2TbHeight, cIdx ) { | |
|   if( transform_skip_enabled_flag && ( cIdx ! = 0 \| \| cu_mts_flag[ x0 ][ y0 ] = = 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TbWidth + log2TbHeight 2 * log2SbSize ) ) 1 | |
|   do { | |
|     if( lastScanPos = = 0 ) { | |
|       lastScanPos = numSbCoeff | |
|       lastSubBlock− − | |
|     } | |
|     lastScanPos | |
|     xS = DiagScanOrder[ log2TbWidth − log2SbSize ][ log2TbHeight − log2SbSize ] | |
|           [ lastSubBlock ][ 0 ] | |
|     yS = DiagScanOrder[ log2TbWidth − log2SbSize ][ log2TbHeight − log2SbSize ] | |
|           [ lastSubBlock ][ 1 ] | |
|     xC = ( xS << log2SbSize ) + | |
|       DiagScanOrder[ log2SbSize ][ log2SbSize ][ lastScanPos ][ 0 ] | |
|     yC = ( yS << log2SbSize ) + | |
|       DiagScanOrder[ log2SbSize ][ log2SbSize ][ lastScanPos ][ 1 ] | |
|   } while( ( xC != LastSignificantCoeffX ) \| \| ( yC != LastSignificantCoeffY ) ) | |
|   numSigCoeff = 0 | |
|   QState = 0 | |
|   for( i = lastSubBlock; i >= 0; i− − ) { | |
|     startQStateSb = QState | |
|     xS = DiagScanOrder[ log2TbWidth − log2SbSize ][ log2TbHeight − log2SbSize ] | |
|             [ lastSubBlock ][ 0 ] | |
|     yS = DiagScanOrder[ log2TbWidth − log2SbSize ][ log2TbHeight − log2SbSize ] | |
|             [ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = −1 | |
|     remBinsPass1 = ( log2SbSize < 2 ? 6 : 28 ) | |
|     remBinsPass2 = ( log2SbSize < 2 ? 2 : 4 ) | |
|     firstPosMode0 = ( i = = lastSubBlock ? lastScanPos − 1 : numSbCoeff − 1 ) | |
|     firstPosMode1 = −1 | |
|     firstPosMode2 = −1 | |
|     for( n = firstPosMode0; n >= 0 && remBinsPass1 >= 3; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && ( n > 0 \| \| !inferSbDcSigCoeffFlag ) ) { | |
|         sig_coeff_flag[ xC ][ yC ] | ae(v) |
|         remBinsPass1− − | |
|         if( sig_coeff_flag[ xC ][ yC ] ) | |
|           inferSbDcSigCoeffFlag = 0 | |
|       } | |
|       if( sig_coeff_flag[ xC ][ yC ] ) { | |
|         numSigCoeff++ | |
|         abs_level_gt1_flag[ n ] | ae(v) |
|         remBinsPass1− − | |
|         if( abs_level_gt1_flag[ n ] ) { | |
|           par_level_flag[ n ] | |
|           remBinsPass1− − | |
|           if( remBinsPass2 > 0 ) { | |
|             remBinsPass2− − | |
|             if( remBinsPass2 = = 0 ) | |
|               firstPosMode1 = n − 1 | |
|           } | |
|         } | |
|         if( lastSigScanPosSb = = −1 ) | |
|           lastSigScanPosSb = n | |
|         firstSigScanPosSb = n | |
|       } | |
|       AbsLevelPass1[ xC ][ yC ] + | |
|         sig_coeff_flag[ xC ][ yC ] + par_level_flag[ n ] + abs_level_gt1_flag[ n ] | |
|       if( dep_quant_enabled_flag ) | |

TABLE 1-continued

Descriptor

```
            QState = QStateTransTable[ QState ][ AbsLevelPass1[ xC ][ yC ] & 1 ]
        if( remBinsPass1 < 3 )
            firstPosMode2 = n − 1
    }
    if( firstPosMode1 < firstPosMode2 )
        firstPosMode1 = firstPosMode2
    for( n = numSbCoeff − 1; n > firstPosMode1; n− − ) {
        if( abs_level_gt1_flag[ n ])
            abs_level_gt2_flag[ n ]                                                             ae(v)
    }
    for( n = numSbCoeff − 1; n > firstPosMode1; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt3_flag[ n ] )
            abs_remainder[ n ]
        Abslevel[ xC ][ yC ] = AbsLevelPass1[ xC ][ yC ] +
                    2 * ( abs_level_gt3_flag[ n ] + abs_remainder[ n ] )
    }
    for( n = firstPosMode1; n > firstPosMode2; n− − ){
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt1_flag[ n ] )
            abs_remainder[ n ]
        AbsLevel[ xC ][ yC ] = AbsLevelPass1[ xC ][ yC ] + 2 * abs_remainder[ n ]
    }
    for( n = firstPosMode2; n >= 0; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        abs_level[ n ]
        AbsLevel[ xC ][ yC ] = abs_level[ n ]
        if( abs_level[ n ] > 0 )
            firstSigScanPosSb = n
        if( dep_quant_enabled_flag )
            QState = QStateTransTable[ QState ][ abs_level[ n ] & 1 ]
    }
    if( dep_quant_enabled_flag | | !sign_data_hiding_enabled_flag )
        signHidden = 0
    else
        signHidden = ( lastSigScanPosSb − firstSigScanPosSb > 3 ? 1 : 0 )
    for( n = numSbCoeff − 1; n >= 0; n− − ){
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( sig_coeff_flag[ xC ][ yC ] &&
                ( !signHidden | | ( n != firstSigScanPosSb ) ) )
            coeff_sign_flag[ n ]                                                                ae(v)
    }
    if( dep_quant_enabled_flag ) {
        QState = startQStateSb
        for( n = numSbCoeff − 1; n >= 0; n− − ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] )
                TransCoeffLevel[ x0 ][ y0 ][ cIdx ][ xC ][ yC ] =
                    ( 2 * AbsLevel[ xC ][ yC ] − ( QState > 1 ? 1 : 0 ) ) *
                    ( 1 − 2 * coeff_sign_flag[ n ] )
            QState = QStateTransTable[ QState ][ par_level_flag[ n ] ]
        }
    } else {
        sumAbsLevel = 0
        for( n = numSbCoeff − 1; n >= 0; n− − ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] ) {
                TransCoeffLevel[ x0 ][ y0 ][ cIdx ][ xC ][ yC ] =
                    AbsLevel[ xC ][ yC ] * ( 1 − 2 * coeff_sign_flag[ n ] )
                if( signHidden ) {
                    sumAbsLevel += AbsLevel[ xC ][ yC ]
                    if( ( n = = firstSigScanPosSb ) && ( sumAbsLevel % 2 ) = = 1 ) )
                        TransCoeffLevel[ x0 ][ y0 ][ cIdx ][ xC ][ yC ] =
                            −TransCoeffLevel[ x0 ][ y0 ][ cIdx ][ xC ][ yC ]
                }
            }
        }
    }
}
```

TABLE 1-continued

| | Descriptor |
|---|---|
| if( cu_mts_flag[ x0 ][ y0 ] && ( cIdx = = 0) && <br>   !transform_skip_flag[ x0 ][ y0 ][ cIdx ] && <br>   ( ( CuPredMode[ x0 ][ y0 ] = = MODE_INTRA && numSigCoeff > 2 ) \|\| <br>     ( CuPredMode[ x0 ][ y0 ] = = MODE_INTER ) ) ) { <br>     mts_idx[ x0 ][ y0 ] <br> } | <br><br><br><br>ae(v) | transform_skip_flag represents whether a transform is omitted in an associated block. The transform_skip_flag may be a syntax element of a transform skip flag. The associated block may be a coding block (CB) or a transform block (TB). For the transform (and quantization) and residual coding process, a CB and a TB may be used in a mixed manner. For example, it is as described above that residual samples may be derived for a CB, and (quantized) transform coefficients may be derived through transform and quantization for the residual samples, and through the residual coding process, information representing a position, a size, a code, and the like of the (quantized) transform coefficients efficiently (e.g., syntax elements) may be generated and signaled. The quantized transform coefficients may be called transform coefficients, simply. Generally, in the case that a CB is not greater than a maximum TB, a size of CB may be equal to a size of TB, and in this case, a target block which is transformed (and quantized) and residual-coded may be called a CB or a TB. Meanwhile, in the case that a CB is not greater than a maximum TB, a target block which is transformed (and quantized) and residual-coded may be called a TB. Hereinafter, it is described that syntax elements related to residual coding are signaled in a unit of TB, but this is just an example, and the TB may be used with the CB in a mixed manner, as described above.

As an embodiment, the encoding apparatus may encode (x, y) position information of a transform coefficient of which the last block in a transform block is not zero based on syntax elements, last_sig_coeff_x_prefix, last_sig_coeff_y_prefix, last_sig_coeff_x_suffix and last_sig_coeff_y_suffix. More particularly, the last_sig_coeff_x_prefix represents a prefix of a column position of the last significant coefficient in a scanning order in a transform block, the last_sig_coeff_y_prefix represents a prefix of a row position of the last significant coefficient in the scanning order in the transform block, the last_sig_coeff_x_suffix represents a suffix of a column position of the last significant coefficient in a scanning order in a transform block, and the last_sig_coeff_y_suffix represents a suffix of a row position of the last significant coefficient in the scanning order in the transform block. Here, the significant coefficient may represent a non-zero coefficient. In addition, the scanning order may be a horizontal scanning order or a vertical scanning order. The scanning order may be determined based on whether intra/inter prediction is applied to a target block (CB or CB including TB) and/or a specific intra/inter prediction.

Next, the encoding apparatus may split the transform block into 4×4 sub-blocks and represent whether a non-zero coefficient is present in a current sub-block by using the 1-bit syntax element coded_sub_block_flag for each of the 4×4 sub-blocks.

Since there is no further information to transmit when the coded_sub_block_flag value is 0, the encoding apparatus may terminate the encoding process for the current sub-block. On the other hand, when the coded_sub_block_flag value is 1, the encoding apparatus may perform the encoding process for sig_coeff_flag continuously. For the sub-block including the last non-zero coefficient, encoding for the coded_sub_block_flag is not required, and it is highly probable that the sub-block including DC information of a transform block includes a non-zero coefficient, and accordingly, it may be assumed that the coded_sub_block_flag is not encoded, and the value is 1.

In the case that the coded_sub_block_flag value is 1, and it is determined that a non-zero coefficient is present in the current sub-block, the encoding apparatus may encode the sig_coeff_flag having a binary value according to the order which is reversely scanned. The encoding apparatus may encode the 1 bit syntax element sig_coeff_flag for each transform coefficient according to the scanning order. In the case that a transform coefficient value in the current scan position is non-zero, the sig_coeff_flag value may be 1. Here, in the case of the sub-block including the last non-zero coefficient, since the sig_coeff_flag is not required to be encoded for the last non-zero coefficient, the encoding process for the sub-block may be omitted. A level information encoding may be performed only in the case that the sig_coeff_flag is 1, and for the level information encoding process, four syntax elements may be used. More particularly, each sig_coeff_flag[xC][yC] may represent whether a level (value) of the corresponding transform coefficient in each transform coefficient position (xC, yC) in a current TB is non-zero. As an embodiment, the sig_coeff_flag may correspond to an example of the syntax element of a significant coefficient flag that represent whether a quantized transform coefficient is the significant coefficient, which is non-zero.

The remaining level value after encoding for the sig_coeff_flag may be derived as represented in the following equation. That is, the syntax element remAbsLevel representing a level value to be encoded may be derived as represented in the following equation.

$$remAbsLevel = |coeff| - 1 \quad \text{[Equation 1]}$$

Here, coeff means an actual transform coefficient value.

In addition, the least significant coefficient (LSB) of remAbsLevel denoted in Equation 1 described above may be encoded as represented in Equation 2 below through par_level_flag.

$$par\_level\_flag = remAbsLevel \& 1 \quad \text{[Equation 2]}$$

Here, par_level_flag[n] may represent a parity of a transform coefficient level (value) in a scanning position n.

The transform coefficient level value remAbsLevel which is to be encoded after encoding the par_level_flag may be updated as represented in the following equation.

$$remAbsLevel' = remAbsLevel >> 1 \quad \text{[Equation 3]}$$

rem_abs_gt1_flag may represent whether remAbsLevel' in the corresponding scanning position (n) is greater than 1, and rem_abs_gt2_flag may represent whether remAbsLevel' in the corresponding scanning position (n) is greater than 2. Encoding for the abs_remainder may be performed only in the case that the rem_abs_gt2_flag is 1. The relationship between coeff, which is an actual transform coefficient, and each of the syntax elements may be as represented in the following equation.

$$|coeff|=sig\_coeff\_flag+par\_level\_flag+2* \\ (rem\_abs\_gt1\_flag+rem\_abs\_gt2\_flag+abs\_remainder) \qquad \text{[Equation 4]}$$

In addition, the following table represents examples in relation to Equation 4 described above.

TABLE 2

| \|coeff\| | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

Here, coeff may represent a transform coefficient level (value) and may be represented as AbsLevel for a transform coefficient. In addition, a sign of each coefficient may be encoded by using coeff_sign_flag which is 1 bit symbol.

Meanwhile, in an embodiment, the par_level_flag may represent an example of the syntax element of the parity level flag for the parity of the transform coefficient level for the quantized transform coefficient, the rem_abs_gt1_flag may represent an example of the syntax element of a first transform coefficient level flag on whether the transform coefficient level is greater than a first threshold value, and the rem_abs_gt2_flag may represent an example of the syntax element of a second transform coefficient level flag on whether the transform coefficient level is greater than a second threshold value.

Figure 5:
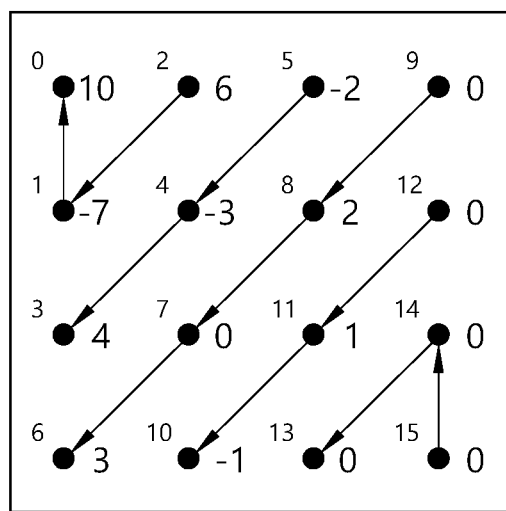
FIG. 5 is a diagram illustrating examples of transform coefficients in a 4×4 block.

FIG. 5 is a diagram illustrating examples of transform coefficients in a 4×4 block.

The 4×4 block shown in FIG. 5 shows an example of quantized coefficients. The block shown in FIG. 5 may be a 4×4 transform block or a 4×4 sub-block of 8×8, 16×16, 32×32 or 64×64 transform block. The 4×4 block shown in FIG. 5 may represent a luma block or a chroma block.

For example, the encoding result for coefficients that are scanned in reverse diagonal direction of FIG. 5 may be as represented in the following table.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 0 | 1 | 0 |
| rem_abs_gt1_flag | | | | | 0 | 0 | | 0 | | 1 | 0 | 1 | 1 | 1 | 1 | 1 |
| rem_abs_gt2_flag | | | | | | | | | | 0 | | 0 | 0 | 1 | 1 | 1 |
| abs_remainder | | | | | | | | | | | | | | 0 | 1 | 2 |
| ceoff_sign_flag | | | | | 0 | 1 | | 0 | | 0 | 1 | 1 | 0 | 0 | 1 | 0 |

In Table 3 above, scan_pos represents a position of coefficient according to reverse diagonal scan. scan_pos 15 may be a transform coefficient which is firstly scanned in the 4×4 block, that is, a bottom right transform coefficient, and scan_pos 0 may be a transform coefficient which is lastly scanned in the 4×4 block, that is, a top left transform coefficient. For example, the scan_pos 0 may be referred to as scan position 0.

Meanwhile, as described above, in the case that an input signal is not a binary value but a syntax element, the encoding apparatus may transform the input signal into a binary value by binarizing the input signal value. Furthermore, the decoding apparatus may derive a binarized value (i.e., binarized bin) of the syntax element by decoding the syntax element and derive a value of the syntax element by inverse-binarizing the binarized value. The binarization process may be performed by Truncated Rice (TR) binarization process, k-th order Exp-Golomb (EGk) binarization process, or Fixed-length (FL) binarization process, which are described below. In addition, the inverse binarization process may represent a process of deriving a value of the syntax element by being performed based on the TR binarization process, the EGk binarization process or the FL binarization process.

For example, the TR binarization process may be performed as below.

An input to the TR binarization process may be a request for a TR binarization, cMax and cRiceParam. Furthermore, an output of the TR binarization process may be the TR binarization associating the value symbolVal with a corresponding bin string.

Particularly, as an example, in the case that a suffix bin string for the syntax element is present, the TR bin string for the syntax element may be a concatenation of a prefix bin string and the suffix bin string, and in the case that a suffix bin string for the syntax element is not present, the TR bin string for the syntax element may be the prefix bin string. For example, the prefix bin string may be derived as described below.

The prefix value of the symbolVal for the syntax element may be derived as represented in the following equation.

$$prefixVal = symbolVal >> cRiceParam \qquad \text{[Equation 5]}$$

Herein, prefixVal may represent the prefix value of the symbolVal. The prefix of the TR bin string of the syntax element (i.e., prefix bin string) may be derived as described below.

For example, in the case that the prefixVal is less than cMax>>cRiceParam, the prefix bin string may be a bit string of length prefixVal+1 indexed by binIdx. That is, in the case that the prefixVal is less than cMax>>cRiceParam, the prefix bin string may be a bit string of prefixVal+1 bit number indexed by binIdx. The bins for binIdx less than prefixVal may be equal to 1. In addition, the bin with binIdx equal to prefixVal may be equal to 0.

For example, the following table represents the bin strings derived by unary binarization for prefixVal.

TABLE 4

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, in the case that the prefixVal is not less than cMax>>cRiceParam, the prefix bin string may be a bit string with all bins being equal to 1.

In addition, in the case that cMax is greater than symbolVal and cRiceParam is greater than 0, the suffix bin string of the TR bin string may be present. For example, the suffix bin string may be derived as follows:

The suffix value of the suffixVal for the syntax element may be derived as represented in the following equation.

$$\text{suffixVal} = \text{symbolVal} - ((\text{prefixVal}) >> c\text{RiceParam}) \quad \text{[Equation 6]}$$

Herein, suffixVal may represent a suffix value of the symbolVal.

The suffix (i.e., suffix bin string) of the TR bin string may be derived based on the FL binarization process for suffixVal with a cMax value equal to (1<<cRiceParam)−1.

Meanwhile, in the case that the input parameter cRiceParam value is 0, the TR binarization may be exactly a truncated unary binarization and a cMax value equal to the largest possible value of the syntax element being decoded may be used always.

In addition, for example, the EGk binarization process may be performed as below. Syntax elements coded as ue(v) may be Exp-Golomb-coded syntax element.

As an example, 0-th order Exp-Golomb (EGO) binarization process may be performed as below.

The parsing process for the syntax elements may begin with reading the bits including the first non-zero bit starting at the current location in the bitstream and counting the number of leading bits that are equal to 0. This process may be represented as the following table.

TABLE 5 leadingZeroBits = −1
for( b = 0; !b; leadingZeroBits++ )
   b = read_bits( 1 )

The variable codeNum may be derived as represented in the following equation.

$$\text{codeNum} = 2^{\text{leadingZeroBits}} - 1 + \text{read\_bits}(\text{leadingZeroBits}) \quad \text{[Equation 7]}$$

Herein, the value returned from read_bits (leadingZeroBits), that is, the value represented by read_bits (leadingZeroBits) may be interpreted as a binary representation of an unsigned integer with most significant bit written first.

The following table may illustrate the structure of the Exp-Golomb code by separating the bit string into "prefix" and "suffix" bits.

TABLE 6

| Bit string form | Range of codeNum |
|---|---|
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

The "prefix" bits may be those bits that are parsed as specified above for the computation of leadingZeroBits. That is, the bit string shown as either 0 or 1 in Table 6 above may represent prefix bit string. The "suffix" bits may be those bits that are parsed in the computation of codeNum and may be shown as xi in Table 6. That is, the bit string represented with xi in Table 6 above may represent the suffix bit string. Here, i may be a value in the range of 0 to leadingZeroBits−1. Furthermore, each xi may be equal to either 0 or 1.

The bit string assigned to the codeNum may be as represented in the following table.

TABLE 7

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

In the case that a descriptor of the syntax element is ue(v), that is, the syntax element is coded as ue(v), the value of the syntax element may be equal to codeNum.

In addition, for example, the EGk binarization process may be performed as below.

An input to the EGk binarization process may be a request for the EGk binarization. In addition, an output of the EGk binarization process may be the EGk binarization associating a value symbolVal corresponding to bin string.

The bit string of the EGk binarization process for symbolVal may be derived as follows.

TABLE 8

```
absV = Abs( symbolVal )
stopLoop = 0
do
    if( absV >= ( 1 << k ) ) {
        put( 1 )
        absV = absV - ( 1 << k )
        k++
    } else {
        put( 0 )
        while( k- - )
            put( ( absV >> k ) & 1 )
        stopLoop = 1
    }
while( !stopLoop )
```

Referring to Table 8 above, a binary value X may be added at the end of the bin string through each call of put(X). Herein, X may be equal to 0 or 1.

In addition, for example, the FL binarization process may be performed as below.

An input to the FL binarization process may be a request for the FL binarization and cMax for the syntax element. Furthermore, an output of the FL binarization process may be the FL binarization associating each value symbolVal corresponding to bin string.

The FL binarization may be constructed by using a bit string having a fixed length bit number of symbol value symbolVal. Here, the fixed length bit may be an unsigned integer bin string. That is, a bit string for the symbol value symbolVal may be derived through the FL binarization, and the bit length (i.e., bit number) of the bit string may be a fixed length.

For example, the fixed length may be derived as represented in the following equation.

$$\text{fixedLength} = \text{Ceil}(\text{Log } 2(c\text{ Max}+1)) \quad \text{[Equation 8]}$$

The indexing of bins for the FL binarization may be a scheme of using increasing values in an order from the most significant bit to the least significant bit. For example, the bin index associated with the most significant bit may be binIdx=0.

Meanwhile, for example, in the residual information, a binarization process for the syntax element abs_remainder may be performed as below.

An input to the binarization process for abs_remainder may be a request for a binarization for the syntax element abs_remainder[n], the color component cIdx, the luma location (x0, y0), the current coefficient scan location (xC, yC), the binary logarithm of the transform block width log 2TbWidth, and the binary logarithm of the transform block height log 2TbHeight. The luma location (x0, y0) may indicate the top-left sample of the current luma transform block relative to the top-left luma sample of the picture.

An output of the binarization process for abs_remainder may be the binarization of the abs_remainder (i.e., binarized bin string of the abs_remainder). The available bin strings may be derived for the abs_remainder through the binarization process.

The Rice parameter cRiceParam for the abs_remainder may be derived through the Rice parameter derivation process with the color component cIdx, the luma location (x0, y0), the current coefficient scan location, and the transform block height log 2TbHeight as inputs. Detailed description for the Rice parameter derivation process is described below.

In addition, for example, the cMax for the abs_remainder may be derived based on the Rice parameter cRiceParam for the abs_remainder. The cMax may be derived from the following equation.

$$c\text{ Max}=(c\text{RiceParam}==1?6:7)<<c\text{RiceParam} \quad \text{[Equation 9]}$$

Referring to Equation 9 above, when the cRiceParam value is 1, the cMax may be derived as 6<<cRiceParam, and when the cRiceParam value is not 1, the cMax may be derived as 7<<cRiceParam.

Meanwhile, the binarization of the abs_remainder, that is, the bin string for the abs_remainder may be a concatenation of a prefix bin string and a suffix bin string in the case that the suffix bin string is present. In addition, in the case that the suffix bin string is not present, the bin string for the abs_remainder may be the prefix bin string.

For example, the prefix bin string may be derived as follows.

The prefix value of the abs_remainder, prefixVal, may be derived as represented in the following equation.

$$\text{prefixVal}=\text{Min}(c\text{ Max},\text{abs\_remainder}[n]) \quad \text{[Equation 10]}$$

The prefix (i.e., prefix bin string) of the abs_remainder may be derived through the TR binarization process for prefixVal with the variables cMax and cRiceParam as inputs.

When the prefix bin string is equal to the bit string of length 4 with all bits equal to 1, the suffix bin string of the bin string of the abs_remainder may be present, and may be derived as follows.

The suffix value of the abs_remainder, suffixVal, may be derived as represented in the following equation.

$$\text{suffixVal}=\text{abs\_remainder}[n]c\text{ Max} \quad \text{[Equation 11]}$$

The suffix bin string of the bin string of the abs_remainder may be derived through the EGk binarization process for the suffixVal with k set equal to cRiceParam+1.

Meanwhile, the Rice parameter derivation process may be as below.

An Input to the Rice parameter derivation process may be the color component index cIdx, the luma location (x0, y0), the current coefficient scan location (xC, yC), the binary logarithm of the transform block width log 2TbWidth, and the binary logarithm of the transform block height log 2TbHeight. The luma location (x0, y0) may indicate the top-left sample of the current luma transform block relative to the top-left luma sample of the picture. In addition, an output of the Rice parameter derivation process may be the Rice parameter cRiceParam.

For example, Given the syntax elements sig_coeff_flag [x][y] and the array AbsLevel[x][C] for the transform block with component index cIdx and the top-left luma location (x0, y0), the variable locSumAbs may be derived as the pseudo code represented in the following table.

TABLE 9

```
locSumAbs = 0
if( xC < (1 << log2TbWidth) - 1 ) {
    locSumAbs += AbsLevel[ xC + 1 ][ yC ] - sig_coeff_flag[ xC + 1 ][ yC ]
    if( xC < (1 << log2TbWidth) - 2 )
```

TABLE 9-continued

```
    locSumAbs += AbsLevel[ xC + 2 ][ yC ] − sig_coeff_flag[ xC + 2 ][ yC ]
  if( yC < (1 << log2TbHeight) − 1 )
    locSumAbs += AbsLevel[ xC + 1 ][ yC + 1 ] − sig_coeff_flag[ xC + 1 ][ yC + 1 ]
}
if( yC < (1 << log2TbHeight) − 1 ) {
    locSumAbs += AbsLevel[ xC ][ yC + 1 ] − sig_coeff_flag[ xC ][ yC + 1 ]
  if( yC < (1 << log2TbHeight) − 2 )
    locSumAbsPass1 += AbsLevelPass1 [ xC ][ yC + 2 ] − sig_coeff_flag[ xC ][ yC + 2 ]
}
```

The Rice parameter cRiceParam may be derived as follows.

For example, in the case that the locSumAbs is less than 12, the cRiceParam may be set equal to 0. Otherwise, in the case that the locSumAbs is less than 25, not corresponding to the above condition (i.e., the locSumAbs is 12 or more and less than 25), the cRiceParam may be set equal to 1. Otherwise, in the case of not corresponding to the above condition (i.e., the locSumAbs is greater than or equal to 25), the cRiceParam may be set equal to 2.

Meanwhile, as represented in Table 1 described above, according to the VVC standard, before encoding/decoding a residual signal (i.e., residual information), it may be transferred first whether to apply the transform of a corresponding block. That is, before the residual information of a current block is parsed, a transform skip flag (i.e., transform_skip_flag) that represents whether to apply the transform may be parsed first. The transform skip flag may also be referred to as a flag whether to transform or a flag whether to apply transform.

By representing correlation between residual signals in a transform domain, a compaction of data is performed, and this is transferred to the decoding apparatus, but in the case that correlation between residual signals is deficient, data compaction may not be performed sufficiently. In such a case, the transform process including complex computation process may be omitted, and a residual signal of a pixel domain (space domain) may be transferred to the decoding apparatus. Since the residual signal of a pixel domain to which transform is not applied may have different property (e.g., distribution of residual signals, absolute level of each residual signal, etc.) from the residual signal of a normal transform domain, it is proposed a residual signal encoding/decoding method for transferring the signal to a decoder efficiently.

Figure 6:
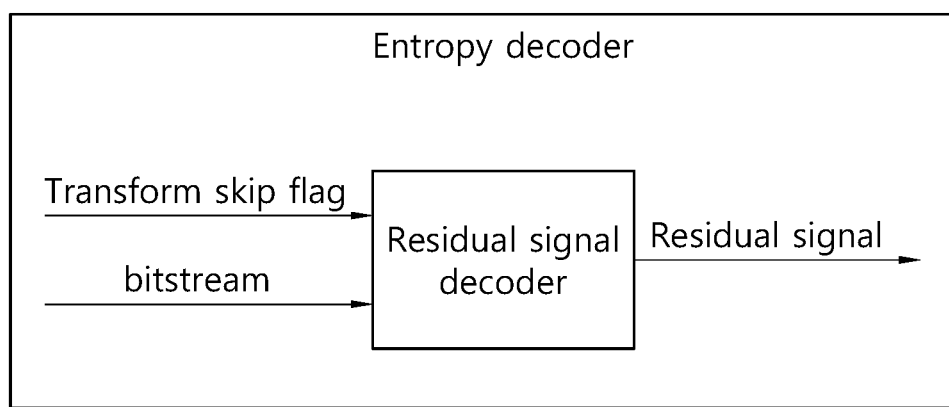
FIG. 6 illustrates a decoding apparatus for performing a method for transferring a residual signal of a pixel domain which is proposed.

FIG. 6 illustrates a decoding apparatus for performing a method for transferring a residual signal of a pixel domain which is proposed.

A transform skip flag may be transmitted in a transform block unit. Here, referring to Table 1 described above, the transform skip flag may be parsed with being restricted to a specific block size. That is, referring to Table 1 described above, the transform skip flag may be parsed only for a transform block of which block size is a specific size or less. For example, in the case that a size of a current transform block is 4×4 size or less, the transform skip flag for the current transform block may be parsed.

In relation to this, as an example, in the present disclosure, it is proposed an embodiment of configuring a size of block that determines whether to parse the transform skip flag in various manner. Particularly, sizes of Log 2TbWidth and log 2TbHeight may be determined as variables wN and hN, respectively, and according to the conventional methods, the wN and hN may be selected as one of the followings.

wN={2, 3, 4, 5, 6}
hN={2, 3, 4, 5, 6}

That is, the wN may be selected as one of 2, 3, 4, 5 and 6, and the hN may be selected as one of 2, 3, 4, 5 and 6.

However, for example, according to the embodiment proposed in the present disclosure, the wN and the hN may not be limited to specific values. The method of parsing the transform skip flag according to the present embodiment may be represented as the following table.

TABLE 10

| if( transform_skip_enabled_flag &&<br>( cIdx != 0 \| \| cu_mts_flag[ x0 ][ y0 ] = = 0 ) &&<br>( log2TbWidth <= wN ) && ( log2TbHeight <= hN ) )<br>  transform_skip_flag[ x0 ][ y0 ][ cIdx ] | ae(v) |
|---|---|

According to the present embodiment represented in Table 10, in the case that Log 2TbWidth representing a width of a current block (i.e., current transform block) is wN or less and log 2TbHeight representing a height of the current block is hN or less, the transform skip flag for the current block may be parsed. Based on the transform skip flag, a method of decoding a residual signal of the current block may be determined. Through the proposed embodiment, signals of which statistical properties are different are efficiently processed, and accordingly, complexity in the entropy decoding process may be reduced, and encoding efficiency may be improved.

Meanwhile, according to the VVC standard, based on level summation of neighboring transform coefficients of the current transform coefficient already encoded and sig_coeff_flag information, a Rice parameter for the transform coefficient of a current scanning position may be determined. Particularly, for example, the Rice parameter may be derived like the pseudo code represented in Table 9 described above. In this case, a problem may occur that it needs to be checked in every time whether positions of transform coefficients which are referred exceed a transform block boundary. That is, whenever a single transform coefficient level is encoded/decoded, 5 boundary checking processes may be accompanied. Accordingly, since times of boundary checking process of a transform coefficient of a size that requires encoding/decoding of the syntax element abs_remainder, a problem of increasing computation complexity may occur when many transform coefficients having great level values are generated. In other words, since multiple boundary checking process needs to be performed to encode/decode transform coefficients having non-zero abs_remainder value, there may be a problem of increasing computation complexity as the number of transform coefficients of which abs_remainder value is non-zero increases. In addition, in the case of a residual coefficient which is not transformed (quantized later), since the residual coefficient is a residual coefficient defined in the pixel domain, the residual coefficient may have little correlation with a neighboring residual coefficient and have randomness.

Accordingly, the present disclosure may propose an embodiment of using a fixed Rice parameter for a residual signal which is not transformed (i.e., the case that transform_skip_flag value is 1) without regard to a level value of a neighboring transform coefficient which is already decoded. Through this, computation complexity may be reduced while residual coding efficiency is maintained. The transform coefficient may also be referred to as a residual coefficient.

Meanwhile, in the case of limiting a summation of sig_coeff_flag, rem_abs_gt1_flag, par_level_flag numbers, the abs_remainder may be determined differently depending on the following three cases. For example, according to a method of limiting a summation of sig_coeff_flag, rem_abs_gt1_flag, par_level_flag numbers, the following (i), (ii) and (iii) may be sequentially occurred in a single lower block (i.e., current transform block).
  (i) All of sig_coeff_flag, par_level_flag, rem_abs_gt1_flag and rem_abs_gt2 flag are present.
  (ii) Only sig_coeff_flag, par_level_flag and rem_abs_gt1_flag are present.
  (iii) All of sig_coeff_flag, par_level_flag, rem_abs_gt1_flag and rem_abs_gt2 flag are not present.

Alternatively, in the case of limiting a summation of sig_coeff_flag, coeff_sign_flag, abs_level_gtX_flag[0], par_level_flag numbers, the abs_remainder may be determined differently depending on the following three cases. For example, according to a method of limiting a summation of sig_coeff_flag, coeff_sign_flag, abs_level_gtX_flag[0], par_level_flag numbers, the following (i), (ii) and (iii) may be sequentially occurred in a single lower block (i.e., current transform block).
  (i) All of sig_coeff_flag, par_level_flag, coeff_sign_flag and abs_level_gtX_flag[0] are present.
  (ii) Only sig_coeff_flag, par_level_flag and abs_level_gtX_flag[0] are present.
  (iii) All of sig_coeff_flag, par_level_flag, coeff_sign_flag and abs_level_gtX_flag[0] are not present.

For (i) case above, the relationship between an actual transform coefficient value coeff and the abs_remainder may be as represented in Equation 4 described above.

In addition, for (ii) case above, the relationship between an actual transform coefficient value coeff and the abs_remainder may be as represented in the following equation.

|coeff|=sig_coeff_flag+par_level_flag+2*(rem_abs_gt1_flag+abs_remainder)   [Equation 12]

Furthermore, for (iii) case above, the relationship between an actual transform coefficient value coeff and the abs_remainder may be as represented in the following equation.

|coeff|=abs_level   [Equation 13]

Referring to the above description, since computation complexity increase in proportional to a size of a reference transform coefficient which is used in the Rice parameter derivation, the present disclosure proposes an embodiment of calculating a Rice parameter by using a level value which is right before under a scan order.

Particularly, according to the present embodiment, a Rice parameter may be initialized only in a starting step of a lower block, and a binarization for the abs_remainder of the lower block may be performed by using a Rice parameter of a fixed value in the lower block without updating the Rice parameter. For example, the Rice parameter may be set to a value among 0, 1, 2, 3, 4 and 5. That is, the Rice parameter for all abs_remainders in a block may be set to a specific value, and the specific value may be one of 0, 1, 2, 3, 4 and 5.

In addition, for example, the Rice parameter may be controlled depending on a transform skip flag. Furthermore, the Rice parameter value may be applied adaptively depending on whether the current block is the luma component or the chroma component.

Alternatively, for example, the Rice parameter value may be applied adaptively depending on a size of a lower block (i.e., current transform block). As an example, in the case that the lower block is a block of a size which is less than a specific size, the Rice parameter for the lower block may be defined as zero, and in the case that the lower block is a block of a size which is a specific size or more, the Rice parameter for the lower block may be defined as 1. The specific size may be derived as 4×4 size, 8×8 size, 16×16 size, 32×32 size, or the like. For example, in the case that the lower block is a block of a size which is 4×4 size or more, the Rice parameter for the lower block may be defined as 1.

The step of being encoded in the Rice coding may be represented by the step of encoding the abs_remainder in the (i), the step of encoding the abs_remainder in the (ii), and the step of encoding the abs_remainder in the (iii).

Figure 7A:
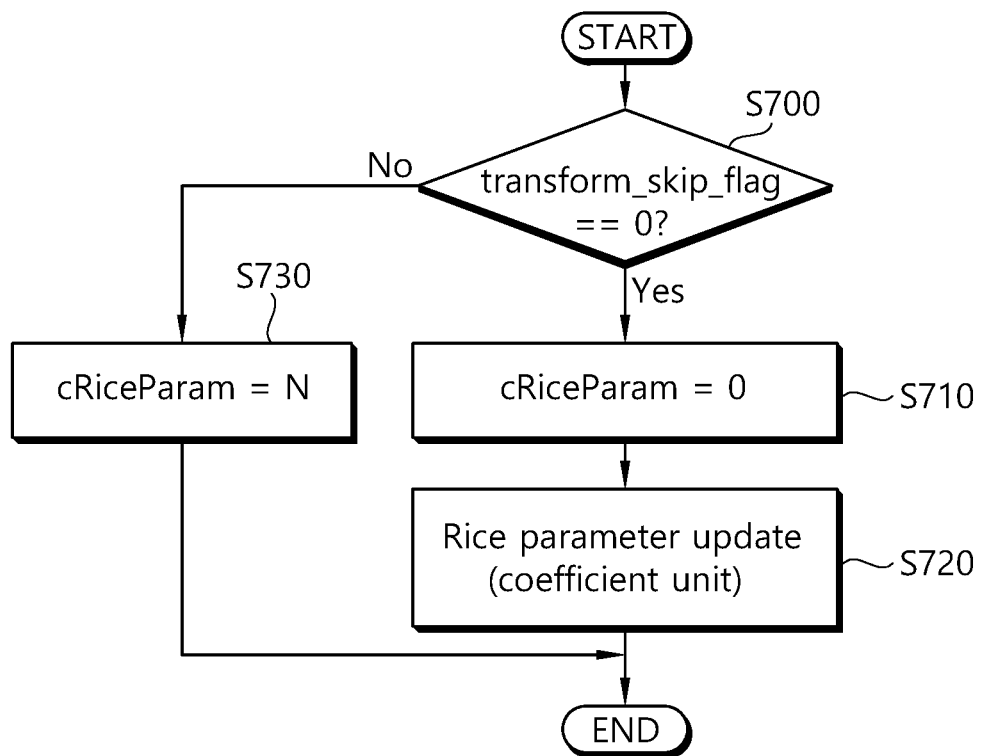
FIGS. 7a and 7b illustrate the proposed embodiment of deriving the Rice parameter and a Rice parameter deriver performing the embodiment.
Figure 7B:
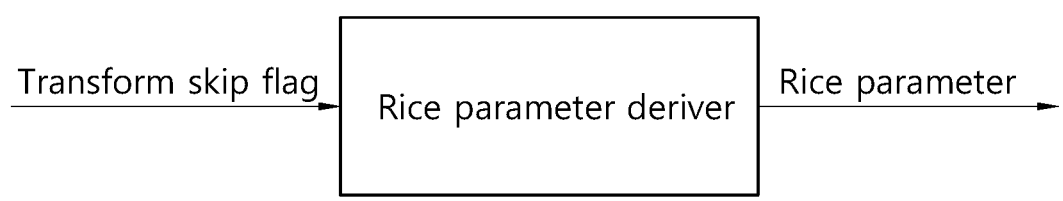

FIGS. 7a and 7b illustrate the proposed embodiment of deriving the Rice parameter and a Rice parameter deriver performing the embodiment.

Referring to FIG. 7a, the encoding apparatus/decoding apparatus may determine whether a value of the transform skip flag of a current block is zero (S700). In the case that the value of the transform skip flag is zero (i.e., the case that transform is applied to the current block), the encoding apparatus/decoding apparatus may set the Rice parameter for the current block as zero (S710). And the Rice parameter may be updated in a transform coefficient unit (S720).

In addition, in the case that the value of the transform skip flag is 1 (i.e., the case that transform is not applied to the current block), the encoding apparatus/decoding apparatus may set the Rice parameter for the current block as N (S730). That is, the Rice parameter may be identically set for the transform coefficients of the current block, and set to N. Here, N may be one of 0, 1, 2, 3, 4 and 5.

Meanwhile, FIG. 7b illustrates the Rice parameter deriver performing the embodiment of deriving the Rice parameter which is proposed. The Rice parameter deriver shown in FIG. 7b may be included in the entropy encoder 240 of the encoding apparatus and may be included in the entropy decoder 310 of the decoding apparatus.

On the other hand, as another example of deriving the Rice parameter, derivation of the Rice parameter may be applied adaptively depending on a size of a lower block (i.e., current transform block). For example, in the case that the lower block is a block of which sample number is less than 256, the Rice parameter for the lower block may be defined as 1, and in the case that the lower block is a block of which sample number is 256 or more, the Rice parameter for the lower block may be defined as 2.

Alternatively, for example, derivation of the Rice parameter may be applied adaptively depending on a ratio of width and height of a lower block (i.e., current transform block). For example, in the case that the ratio of width/height of the lower block is 2, that is, in the case that width/height of the lower block is greater than 2 or less than ½, the Rice parameter for the lower block may be defined as 0, and otherwise, the Rice parameter for the lower block may be defined as 1.

The step of being encoded in the Rice coding may be represented by the step of encoding the abs_remainder in the (i), the step of encoding the abs_remainder in the (ii), and the step of encoding the abs_remainder in the (iii).

Figure 8:
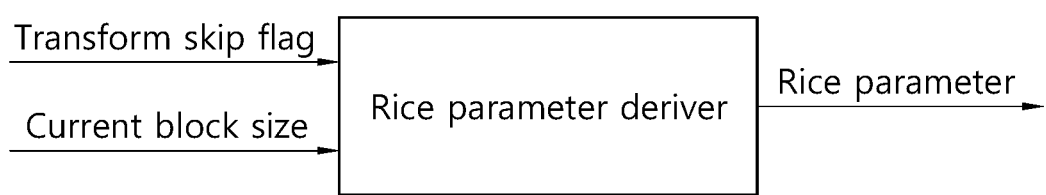
FIG. 8 illustrates a Rice parameter deriver performing the embodiment.

FIG. 8 illustrates a Rice parameter deriver performing the embodiment. The Rice parameter deriver shown in FIG. 8 may derive the Rice parameter for a current block based on a size of the current block and a transform skip flag of the current block. Here, the current block may be a transform block (TB). The Rice parameter deriver shown in FIG. 8 may be included in the entropy encoder 240 of the encoding apparatus and included in the entropy decoder 310 of the decoding apparatus.

Figure 9:
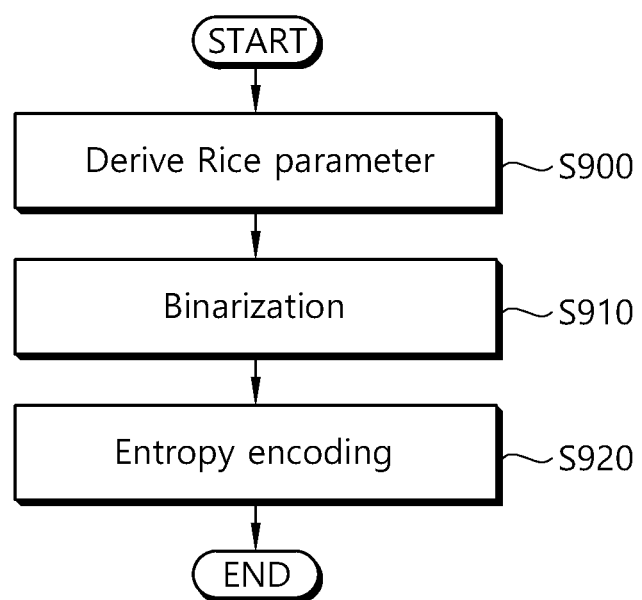
FIG. 9 illustrates a residual encoding method performed by the encoding apparatus.

FIG. 9 illustrates a residual encoding method performed by the encoding apparatus.

Referring to FIG. 9, the encoding apparatus may perform a residual coding process for (quantized) transform coefficients. As described above, the encoding apparatus may perform residual coding of the (quantized) transform coefficients in a current block (current CB or current TB) according to a scanning order. For example, the encoding apparatus may generate and encode the syntax elements for the residual information as represented in Table 1 described above. Steps S900 to S920 may be included in the residual information encoding process.

Particularly, the encoding apparatus may derive a value for the abs_remainder and derive a Rice parameter for the abs_remainder while coding sig_coeff_flag, par_level_flag, rem_abs_gt1_flag, rem_abs_gt2_flag, and the like (S900). The Rice parameter derivation may be performed based on a neighboring reference transform coefficient as described above or determined based on a transform skip flag and/or Transform Block (TB) size. The Rice parameter derivation process may be the same as one of those described in the embodiment.

The encoding apparatus may perform a binarization corresponding to a value for the abs_remainder based on the derived Rice parameter (S910). That is, the encoding apparatus may binarize the value for the abs_remainder based on the derived Rice parameter and derive a corresponding bin string. Here, the binarization process may include the binarization process description for the abs_remainder described above. The encoding apparatus may derive the bin string for the abs_remainder through the binarization process. According to the present disclosure, as described above, based on the Rice parameter, a length of the bin string for the abs_remainder value may be adaptively determined.

The Rice parameter derivation process may be omitted for sig_coeff_flag, par_level_flag, rem_abs_gt1_flag, rem_abs_gt2_flag, and the like, which are binarized based on the FL binarization process without using the Rice parameter. The binarized based on the FL binarization process, not the binarization process based on the Rice parameter, may be performed for the sig_coeff_flag, the par_level_flag, the rem_abs_gt1_flag, the rem_abs_gt2_flag, and the like.

The encoding apparatus may perform entropy encoding for the syntax elements related to residual coding including the abs_remainder (S920). The encoding apparatus may perform entropy encoding based on the bin string for the abs_remainder. The encoding apparatus may perform entropy encoding based on the bin string context based on the entropy coding technique such as context-adaptive arithmetic coding (CABAC), context-adaptive variable length coding (CAVLC), or the like, and the output may be included in a bitstream. The bitstream may include various types of information for image/video decoding such as prediction information in addition to the residual information including the information for the abs_remainder as described above. As described above, the bitstream may be forwarded to the decoding apparatus through a (digital) storage medium or a network.

Figure 10:
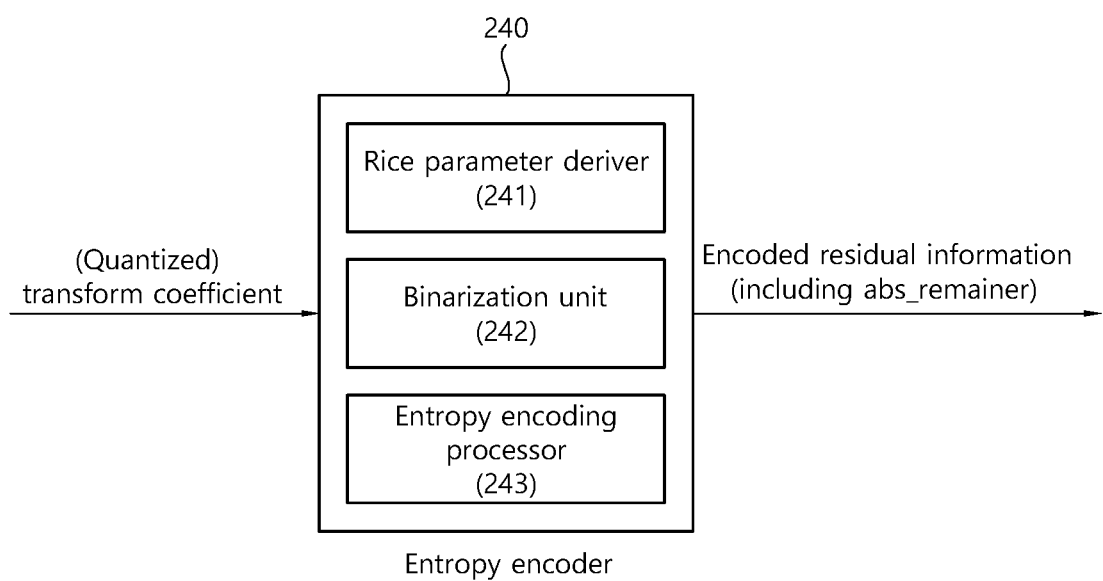
FIG. 10 illustrates the entropy encoder 240 of the encoding apparatus performing the residual encoding method.

FIG. 10 illustrates the entropy encoder 240 of the encoding apparatus performing the residual encoding method. Referring to FIG. 10, the entropy encoder 240 may include a Rice parameter deriver 241, a binarization unit 242 and an entropy encoding processor 243. The Rice parameter derivation process may be performed by the Rice parameter deriver 241 in the entropy encoder 240. In addition, the binarization process may be performed by the binarization unit 242 in the entropy encoder 240. The entropy encoding process may be performed by the entropy encoding processor 243 in the entropy encoder 240.

Figure 11:
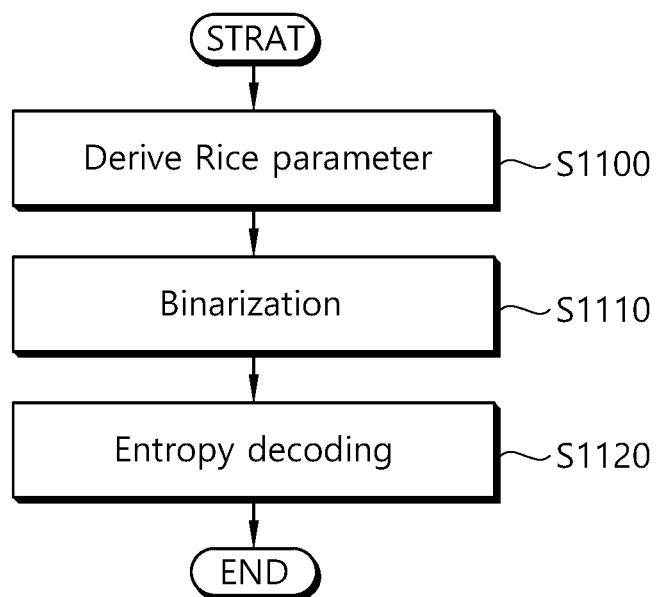
FIG. 11 illustrates a residual decoding method performed by the decoding apparatus.

FIG. 11 illustrates a residual decoding method performed by the decoding apparatus.

Referring to FIG. 11, the decoding apparatus may derive (quantized) transform coefficients by decoding the encoded residual information. For example, the decoding apparatus may derive (quantized) transform coefficients by decoding the residual information encoded in a current block (current CB or current TB) as described above. For example, the decoding apparatus may decode the syntax elements for the residual information as represented in Table 1 described above and derive (quantized) transform coefficients by interpreting values of the syntax elements. Steps S1100 to S1120 may be included in the residual information decoding process.

Particularly, the decoding apparatus may derive a Rice parameter for the syntax element abs_remainder (S1100). The Rice parameter derivation may be performed based on a neighboring reference transform coefficient as described above or determined based on a transform skip flag that represents whether to apply transform and/or TB size. The Rice parameter derivation process may be the same as one of those described in the embodiment.

The decoding apparatus may perform a binarization for the abs_remainder based on the derived Rice parameter (S1110). That is, the decoding apparatus may derive available bin strings for available values for the abs_remainder through the binarization process for the abs_remainder. According to the present disclosure, as described above, based on the Rice parameter, a length of the bin string for the abs_remainder value may be adaptively determined.

The decoding apparatus may perform entropy encoding for the syntax elements related to residual coding including the abs_remainder (S1120). The decoding apparatus may compare the derived bin string with the available bin strings while parsing and decoding each of the bins for the abs_remainder. In the case that the derived bin string is equal to a specific bin string which is one of the available bin strings, a value corresponding to the specific bin string as the value of the abs_remainder. Otherwise, the decoding apparatus may further parse and decode a next bit for the abs_remainder in the bitstream and perform the comparison process. Through the process described above, without using a starting bit or an ending bit for specific information (specific syntax element) in the bitstream, the corresponding information may be signaled by using variable length bit. Through this, relatively smaller bit may be allocated for a lower value, and overall coding efficiency may be improved.

The decoding apparatus may perform entropy decoding based on context of each of the bins in the bin string from the bitstream based on the entropy coding technique such as context-adaptive arithmetic coding (CABAC), context-adaptive variable length coding (CAVLC), or the like. In addition, the bitstream may include various types of information for image/video decoding such as prediction information in addition to the residual information including the information for the abs_remainder as described above. As described above, the bitstream may be forwarded to the decoding apparatus through a (digital) storage medium or a network.

Meanwhile, the Rice parameter derivation process may be omitted for sig_coeff_flag, par_level_flag, rem_abs_gt1_flag, rem_abs_gt2_flag, and the like, which are binarized based on the FL binarization process without using the Rice parameter. The binarized based on the FL binarization process, not the binarization process based on the Rice parameter, may be performed for the sig_coeff_flag, the par_level_flag, the rem_abs_gt1_flag, the rem_abs_gt2_flag, and the like.

Later, the decoding apparatus may perform dequantization and/or inverse transform process of the (quantized) transform coefficients and derive residual samples for the current block. Reconstruction samples may be generated based on the residual samples and prediction samples derived through inter prediction/intra prediction, and a reconstruction picture including the reconstruction samples may be generated, as described above.

Figure 12:
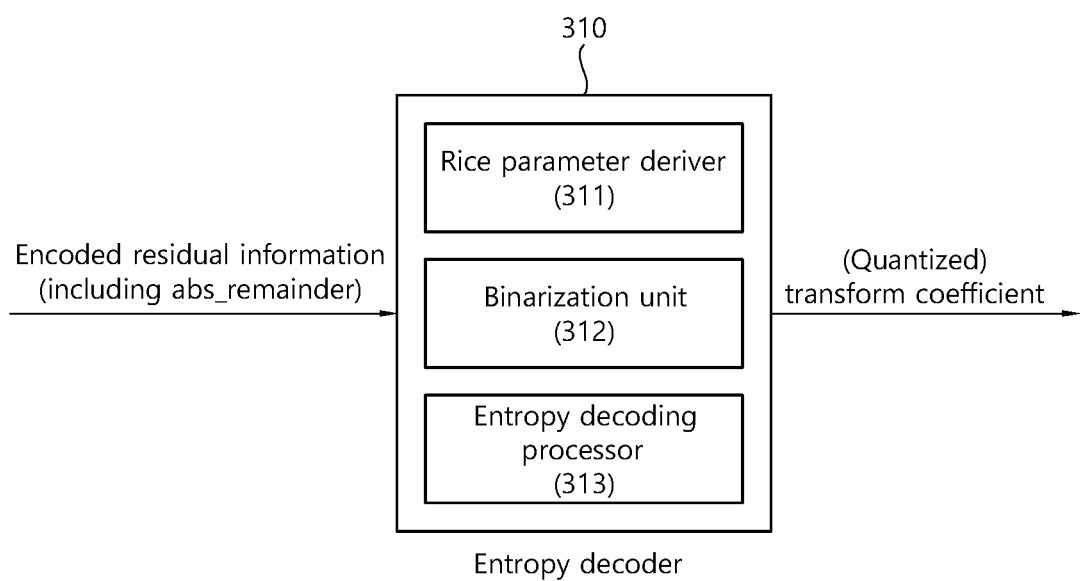
FIG. 12 illustrates the entropy decoder 310 of the decoding apparatus performing the residual decoding method.

FIG. 12 illustrates the entropy decoder 310 of the decoding apparatus performing the residual decoding method. Referring to FIG. 12, the entropy decoder 310 may include a Rice parameter deriver 311, a binarization unit 312 and an entropy decoding processor 313. The Rice parameter derivation process may be performed by the Rice parameter deriver 311 in the entropy decoder 310. In addition, the binarization process may be performed by the binarization unit 312 in the entropy decoder 310. The entropy decoding process may be performed by the entropy decoding processor 313 in the entropy decoder 310.

Figure 13:
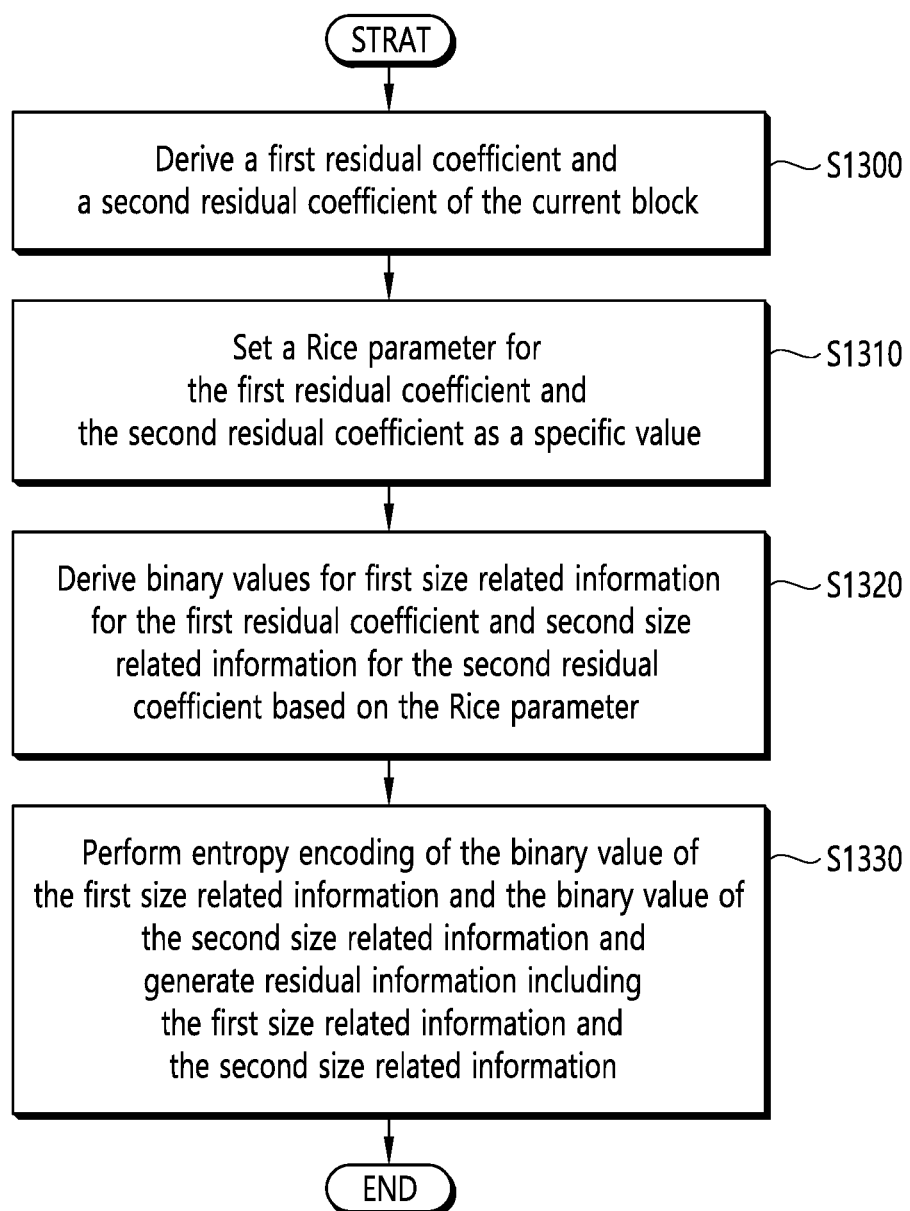
FIG. 13 illustrates an image encoding method by the encoding apparatus according to the present disclosure.

FIG. 13 illustrates an image encoding method by the encoding apparatus according to the present disclosure. The method shown in FIG. 13 may be performed by the encoding apparatus shown in FIG. 2. Particularly, for example, step S1300 of FIG. 13 may be performed by the transformer and/or the quantizer of the encoding apparatus, and steps S1310 to S1330 may be performed by the entropy encoder of the encoding apparatus. In addition, although it is not shown, the process of deriving a prediction sample may be performed by the predictor of the encoding apparatus, the process of deriving a residual sample for the current chroma block based on the original sample and the prediction sample for the current block may be performed by the subtractor of the encoding apparatus, and the process of a reconstruction sample for the current block based on the residual samples and the prediction samples for the current block may be performed by the adder of the encoding apparatus.

The encoding apparatus derives a first residual coefficient and a second residual coefficient of the current block (S1300). The encoding apparatus may determine whether to perform inter prediction or perform intra prediction for the current block and determine a specific inter prediction mode or a specific intra prediction mode based on RD cost. The encoding apparatus may derive prediction samples for the current block according to the determined mode and derive the residual samples through subtraction from the original samples and the prediction samples for the current block.

Later, the encoding apparatus may determine whether a transform is applied to the residual samples. In the case that the transform is not applied to the residual samples, the encoding apparatus may perform quantization on the derived residual samples and derive the first residual coefficient and the second residual coefficient. In addition, in the case that the transform is applied to the residual samples, the encoding apparatus may derive transformed coefficients by performing the transform for the derived residual samples and derive the first residual coefficient and the second residual coefficient by performing quantization for the coefficients.

Meanwhile, the encoding apparatus may generate and encode a transform skip flag that represents whether the transform of the residual coefficients of the current block is applied. Image information may include the transform skip flag for the current block. The transform skip flag may represent whether the transform of the residual coefficients of the current block is applied. That is, the transform skip flag may represent whether the transform is applied to the residual coefficients. The syntax element representing the transform skip flag may be transform_skip_flag described above.

The encoding apparatus set the Rice parameter for the first residual coefficient and the second residual coefficient as a specific value (S1310).

The encoding apparatus may set the Rice parameter for the first residual coefficient and the second residual coefficient as a specific value. The encoding apparatus may set the Rice parameter for binarization of first size related information for the first residual coefficient and second size related information for the second residual coefficient as a specific value. For example, the specific value may be 0, 1, 2, 3, 4 or 5.

As an example, the Rice parameter may be set based on the transform skip flag. For example, when the transform skip flag value is 1, the Rice parameter may be set to a specific value. For example, the specific value may be 0, 1, 2, 3, 4 or 5. In addition, when the transform skip flag value is 0, the Rice parameter, which is different value, may be set to the residual coefficients of the current block. For example, when the transform skip flag value is 0, the Rice parameter for the first residual coefficient of the current block may be set to 0, and the Rice parameter for a residual coefficient except the first residual coefficient may be set (or updated) based on a value of residual coefficient which is decoded before the residual coefficient.

Alternatively, as another example, the Rice parameter value may be set based on a size of the current block. As an example, in the case that the size of the current block is less than a specific size, the Rice parameter for residual coefficient of the current block may be set to zero, and in the case that the size of the current block is a specific size or more, the Rice parameter for residual coefficient of the current block may be defined as 1. The specific size may be derived as 4×4 size, 8×8 size, 16×16 size, 32×32 size, or the like. For example, in the case that the size of the current block is less than 4×4 size, the Rice parameter for residual coefficient of the current block may be defined as 0, and in the case that the size of the current block is 4×4 size or greater, the Rice parameter for residual coefficient of the current block may be defined as 1.

Alternatively, for example, in the case that the sample number of the current block is less than 256, the Rice parameter for residual coefficient of the current block may be set to 1, and in the case that the sample number of the current block is 256 or more, the Rice parameter for residual coefficient of the current block may be set to 2. Here, the size of the current block may represent the sample number of the current block.

Alternatively, as another example, the Rice parameter may be set based on a ratio between a width and a height of the current block. For example, in the case that the ratio between a width and a height of the current block is greater than 2 or less than ½ (i.e., a value of width divided by height is greater than 2 or less than ½, the Rice parameter for residual coefficient of the current block may be set to 0, and in the case that the ratio between a width and a height of the current block is ½ or more and 2 or less (i.e., a value of width divided by height is ½ or more and 2 or less, the Rice parameter for residual coefficient of the current block may be set to 1.

Alternatively, as another example, the Rice parameter may be set based on a component of the current block. That is, the Rice parameter may be set adaptively depending on whether the component of the current block is a luma component or a chroma component.

The encoding apparatus derives binary values for the first size related information for the first residual coefficient and the second size related information for the second residual coefficient based on the Rice parameter (S1320). The encoding apparatus may derive the binary values based on the binarization process for the size related information described above.

For example, the encoding apparatus may derive a cMax for the first size related information based on the Rice parameter and Equation 9 described above. That is, by substituting the Rice parameter to Equation 9 described above, the cMax may be derived. Later, the encoding apparatus may derive a prefix value (i.e., prefixVal described above) for the first size related information based on the cMax and Equation 10 above. That is, by substituting the cMax to Equation 10 described above, the prefix value may be derived. Next, the encoding apparatus may derive a prefix binary value for the first size related information by performing the truncated Rice binarization process for the prefix value. The prefix binary value may be referred to as a prefix bin string. Meanwhile, a suffix binary value for the first size related information may be present, and in the case that the suffix binary value is present, the binary value for the size related information may be concatenation of the prefix binary value and the suffix binary value. The suffix binary value may be referred to as a suffix bin string. For example, a length of the suffix binary value is 4 bits and values of all bits are 1 (i.e., the case the prefix binary value is 1111), the suffix binary value may be present. The encoding apparatus may derive the suffix value for the first size related information (i.e., suffxVal described above) based on the cMax and Equation 11 above. That is, by substituting the cMax to Equation 11 described above, the suffix value may be derived. Later, the encoding apparatus may derive the suffix binary value for the first size related information by performing the k-th order Exp-Golomb (EGk) binarization process for the suffix value. Here, k may be set to a value of the Rice parameter plus 1.

In addition, for example, the encoding apparatus may derive a cMax for the second size related information based on the Rice parameter and Equation 9 described above. That is, by substituting the Rice parameter to Equation 9 described above, the cMax may be derived. Later, the encoding apparatus may derive a prefix value (i.e., prefixVal described above) for the second size related information based on the cMax and Equation 10 above. That is, by substituting the cMax to Equation 10 described above, the prefix value may be derived. Next, the encoding apparatus may derive a prefix binary value for the second size related information by performing the truncated Rice binarization process for the prefix value. The prefix binary value may be referred to as a prefix bin string. Meanwhile, a suffix binary value for the second size related information may be present, and in the case that the suffix binary value is present, the binary value for the size related information may be concatenation of the prefix binary value and the suffix binary value. The suffix binary value may be referred to as a suffix bin string. For example, a length of the suffix binary value is 4 bits and values of all bits are 1 (i.e., the case the prefix binary value is 1111), the suffix binary value may be present. The encoding apparatus may derive the suffix value for the second size related information (i.e., suffxVal described above) based on the cMax and Equation 11 above. That is, by substituting the cMax to Equation 11 described above, the suffix value may be derived. Later, the encoding apparatus may derive the suffix binary value for the second size related information by performing the k-th order Exp-Golomb (EGk) binarization process for the suffix value. Here, k may be set to a value of the Rice parameter plus 1.

The encoding apparatus performs entropy encoding of the binary value of the first size related information and the binary value of the second size related information and generates residual information including the first size related information and the second size related information (S1330).

The encoding apparatus may perform entropy encoding of the binary value of the first size related information and the binary value of the second size related information and derive the first size related information and the second size related information. For example, encoding apparatus may perform bypass encoding of the binary value of the first size related information and the binary value of the second size related information and derive the binary value of the first size related information and the binary value of the second size related information. That is, the encoding apparatus may encode by applying uniform probability distribution to the bin constructing the binary values of the first size related information and encode by applying uniform probability distribution to the bin constructing the binary values of the second size related information. The syntax element representing the first size related information and the second size related information may be the abs_remainder described above.

In addition, for example, the residual information may include information indicating a position of the last non-zero residual coefficient of the current block. The non-zero residual coefficient may also be referred to as a valid coefficient. The information may indicate the position of the last non-zero residual coefficient in the residual coefficient array of the current block. The syntax element indicating the information of the last non-zero residual coefficient may be last_sig_coeff_x_prefix, last_sig_coeff_y_prefix, last_sig_coeff_x_suffix and last_sig_coeff_y_suffix.

Furthermore, for example, the residual information may include information for the residual coefficient. For example, the syntax element indicating the information may be sig_coeff_flag, par_level_flag, rem_abs_gt1_flag, and/or rem_abs_gt2_flag, described above.

In addition, for example, the residual information may include the transform_skip_flag for the current block. The transform_skip_flag may represent whether the transform of the residual coefficients of the current block is applied. That is, the transform_skip_flag may represent whether the transform is applied to the residual coefficients. The syntax element representing the transform_skip_flag may be transform_skip_flag described above.

The encoding apparatus may transmit image information including the residual information. The image information may be output in a bitstream format. Here, for example, the image information may include prediction information for the current block. The prediction information may include information for inter prediction or intra prediction performed in the current block. For example, the prediction information may be information related to the prediction process and include prediction mode information and information related to motion information (e.g., in the case that inter prediction is applied).

Meanwhile, the bitstream may be transmitted to the decoding apparatus through a network or a (digital) storage medium. Here, the network may include a broadcasting network and/or a communication network, and the digital storage medium may include various storage media such as USB, SD, CD, DVD, Blu-ray, HDD, SSD, and the like.

Figure 14:
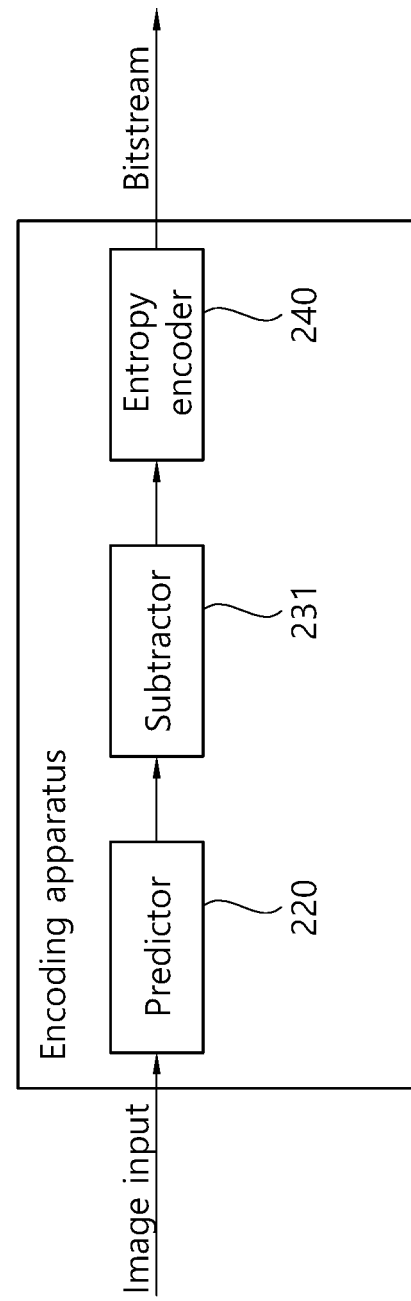
FIG. 14 schematically illustrates the encoding apparatus performing the image encoding method according to the present disclosure.

FIG. 14 schematically illustrates the encoding apparatus performing the image encoding method according to the present disclosure. The method shown in FIG. 13 may be performed by the encoding apparatus shown in FIG. 14. Particularly, for example, the subtractor of the encoding apparatus of FIG. 14 may perform step S1300 of FIG. 13, and the entropy encoder of the encoding apparatus of FIG. 14 may perform steps S1310 to S1330 of FIG. 13. In addition, although it is not shown, the process of deriving a prediction sample may be performed by the predictor of the encoding apparatus.

Figure 15:
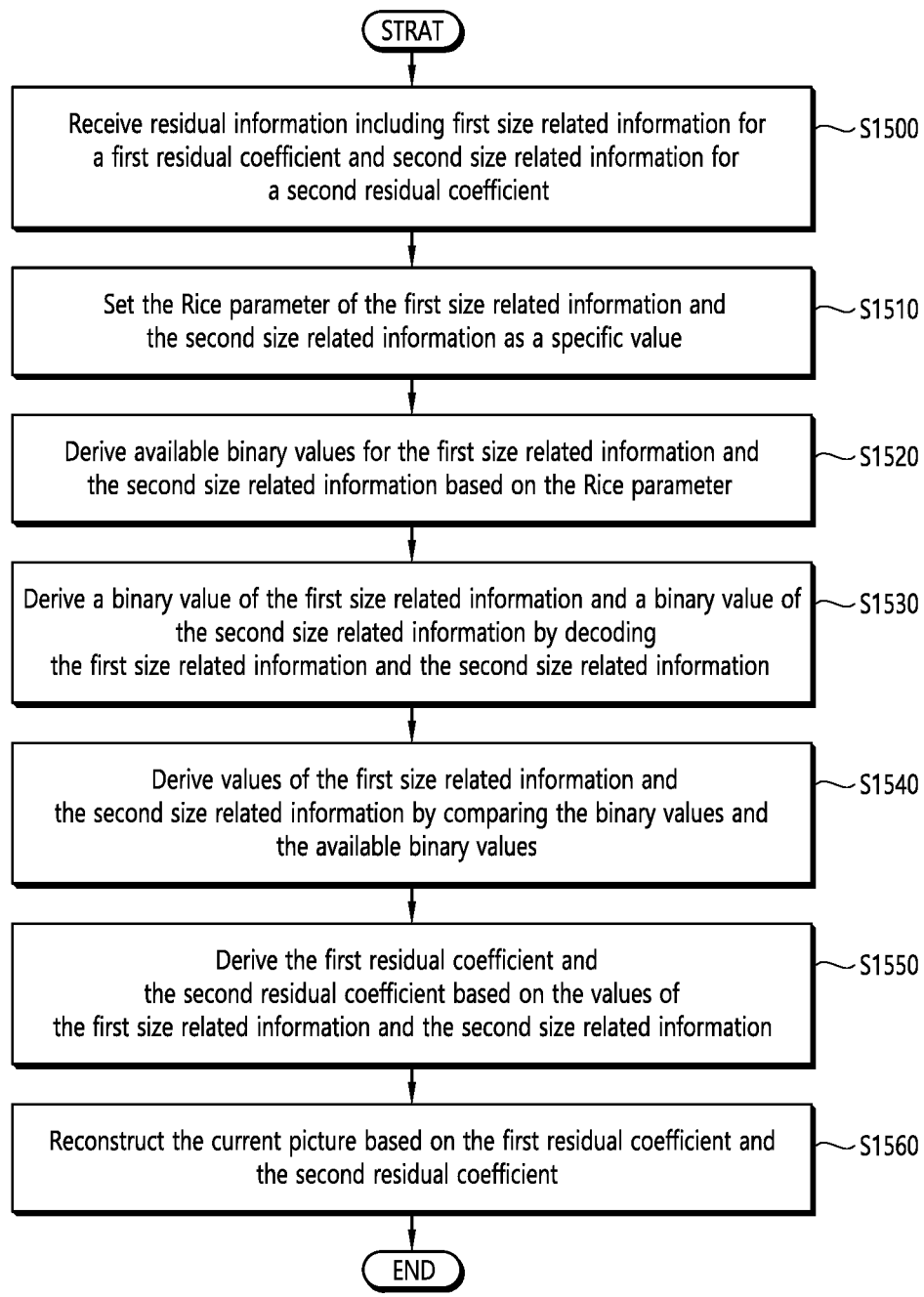
FIG. 15 schematically illustrates the image decoding method of the decoding apparatus according to the present disclosure.

FIG. 15 schematically illustrates the image decoding method of the decoding apparatus according to the present disclosure. The method shown in FIG. 15 may be performed by the decoding apparatus shown in FIG. 3. Particularly, for example, steps S1500 to S1550 of FIG. 15 may be performed by the entropy decoder of the decoding apparatus, and step S1560 may be performed by the adder of the decoding apparatus. In addition, although it is not shown, the process of deriving a prediction sample may be performed by the predictor of the decoding apparatus.

The decoding apparatus receives residual information including first size related information for a first residual coefficient and second size related information for a second residual coefficient (S1500). The decoding apparatus may receive image information including the residual information for the current block through a bitstream. Here, the current block may be a Coding Block (CB) or a Transform Block (TB).

For example, the residual information may include the first size related information for the first residual coefficient and the second size related information for the second residual coefficient. The syntax element representing the first size related information and the second size related information may be the abs_remainder described above.

In addition, for example, the residual information may include information indicating a position of the last non-zero residual coefficient of the current block. The non-zero residual coefficient may also be referred to as a valid coefficient. The information may indicate the position of the last non-zero residual coefficient in the residual coefficient array of the current block. The syntax element indicating the information of the last non-zero residual coefficient may be last_sig_coeff_x_prefix, last_sig_coeff_y_prefix, last_sig_coeff_x_suffix and last_sig_coeff_y_suffix.

Furthermore, for example, the residual information may include information for the residual coefficient. For example, the syntax element indicating the information may be sig_coeff_flag, par_level_flag, rem_abs_gt1_flag, and/or rem_abs_gt2_flag, described above.

In addition, for example, the image information may include the transform_skip_flag for the current block. The transform_skip_flag may represent whether the transform of the residual coefficients of the current block is applied. That is, the transform_skip_flag may represent whether the transform is applied to the residual coefficients. The syntax element representing the transform_skip_flag may be transform_skip_flag described above. When the transform_skip_flag value for the current block is 1, the decoding apparatus may derive residual coefficients based on the received residual information and derive the derived residual coefficients as residual samples. Alternatively, when the transform_skip_flag value for the current block is 0, the decoding apparatus may derive residual coefficients based on the received residual information and derive residual samples by inverse-transforming the derived coefficients.

Meanwhile, the image information may include prediction information for the current block. The prediction information may include information for inter prediction or intra prediction performed in the current block. The decoding apparatus may perform inter prediction or intra prediction for the current block based on the prediction information received through the bitstream and derive prediction samples of the current block.

The decoding apparatus set the Rice parameter of the first size related information and the second size related information as a specific value (S1510). The decoding apparatus may set the Rice parameter of the first size related information and the second size related information as a specific value. The decoding apparatus may set the Rice parameter for binarization of the first size related information and the second size related information as a specific value. For example, the specific value may be 0, 1, 2, 3, 4 or 5.

As an example, the Rice parameter may be set based on the transform skip flag. For example, when the transform skip flag value is 1, the Rice parameter may be set to a specific value. For example, the specific value may be 0, 1, 2, 3, 4 or 5. In addition, when the transform skip flag value is 0, the Rice parameter, which is different value, may be set to the residual coefficients of the current block. For example, when the transform skip flag value is 0, the Rice parameter for the first residual coefficient of the current block may be set to 0, and the Rice parameter for a residual coefficient except the first residual coefficient may be set (or updated) based on a value of residual coefficient which is decoded before the residual coefficient.

Alternatively, as another example, the Rice parameter value may be set based on a size of the current block. As an example, in the case that the size of the current block is less than a specific size, the Rice parameter for residual coefficient of the current block may be set to zero, and in the case that the size of the current block is a specific size or more, the Rice parameter for residual coefficient of the current block may be defined as 1. The specific size may be derived as 4×4 size, 8×8 size, 16×16 size, 32×32 size, or the like. For example, in the case that the size of the current block is less than 4×4 size, the Rice parameter for residual coefficient of the current block may be defined as 0, and in the case that the size of the current block is 4×4 size or greater, the Rice parameter for residual coefficient of the current block may be defined as 1.

Alternatively, for example, in the case that the sample number of the current block is less than 256, the Rice parameter for residual coefficient of the current block may be set to 1, and in the case that the sample number of the current block is 256 or more, the Rice parameter for residual coefficient of the current block may be set to 2. Here, the size of the current block may represent the sample number of the current block.

Alternatively, as another example, the Rice parameter may be set based on a ratio between a width and a height of the current block. For example, in the case that the ratio between a width and a height of the current block is greater than 2 or less than ½ (i.e., a value of width divided by height is greater than 2 or less than ½, the Rice parameter for residual coefficient of the current block may be set to 0, and in the case that the ratio between a width and a height of the current block is ½ or more and 2 or less (i.e., a value of width divided by height is ½ or more and 2 or less, the Rice parameter for residual coefficient of the current block may be set to 1.

Alternatively, as another example, the Rice parameter may be set based on a component of the current block. That is, the Rice parameter may be set adaptively depending on whether the component of the current block is a luma component or a chroma component.

The decoding apparatus derives available binary values for the first size related information and the second size related information based on the Rice parameter (S1520). The decoding apparatus may derive the available binary values based on the binarization process for the size related information. For example, the decoding apparatus may derive a cMax for the first size related information based on the Rice parameter and Equation 9 described above. That is, by substituting the Rice parameter to Equation 9 described above, the cMax may be derived. Later, the decoding apparatus may derive a prefix value (i.e., prefixVal described above) for the size related information based on the cMax and Equation 10 above. That is, by substituting the cMax to Equation 10 described above, the prefix value may be derived. Next, the decoding apparatus may derive a prefix binary value for the size related information by performing the truncated Rice binarization process for the prefix value. The prefix binary value may be referred to as a prefix bin string. Meanwhile, a suffix binary value for the size related information may be present, and in the case that the suffix binary value is present, the binary value for the size related information may be concatenation of the prefix binary value and the suffix binary value. The suffix binary value may be referred to as a suffix bin string. For example, a length of the suffix binary value is 4 bits and values of all bits are 1 (i.e., the case the prefix binary value is 1111), the suffix binary value may be present. The decoding apparatus may derive the suffix value for the size related information (i.e., suffxVal described above) based on the cMax and Equation 11 above. That is, by substituting the cMax to Equation 11 described above, the suffix value may be derived. Later, the decoding apparatus may derive the suffix binary value for the size related information by performing the k-th order Exp-Golomb (EGk) binarization process for the suffix value. Here, k may be set to a value of the Rice parameter plus 1.

The decoding apparatus derives the binary value of the first size related information and the binary value of the second size related information by decoding the first size related information and the second size related information (S1530). The decoding apparatus may derive the binary value (i.e., bin string) of the first size related information by parsing the bin for the first size related information and derive the binary value (i.e., bin string) of the second size related information by parsing the bin for the second size related information.

The decoding apparatus may perform entropy decoding of the first size related information and the second size related information and derive the binary value of the first size related information and the binary value of the second size related information. For example, decoding apparatus may perform bypass decoding of the binary value of the first size related information and the binary value of the second size related information and derive the binary value of the first size related information and the binary value of the second size related information. That is, the decoding apparatus may decode by applying uniform probability distribution to the bin for the first size related information received through the bitstream and decode by applying uniform probability distribution to the bin for the second size related information received through the bitstream.

The decoding apparatus derives values of the first size related information and the second size related information by comparing the binary values and the available binary values (S1540). The decoding apparatus may derive values of the first size related information and the second size related information by comparing the binary values and the available binary values. For example, the decoding apparatus may compare the binary value of the first size related information and the available binary values, and in the case that the binary value of the first size related information is identical to a specific binary value which is one of the available binary values, the decoding apparatus may derive the value for the specific binary value as the value of the first size related information. In addition, decoding apparatus may compare the binary value of the second size related information and the available binary values, and in the case that the binary value of the second size related information is identical to a specific binary value which is one of the available binary values, the decoding apparatus may derive the value for the specific binary value as the value of the second size related information.

The decoding apparatus derives the first residual coefficient and the second residual coefficient based on the values of the first size related information and the second size related information (S1550). For example, when the transform skip flag value for the current block is 1, the decoding apparatus may derive the first residual coefficient and the second residual coefficient based on the values of the first size related information and the second size related information.

The decoding apparatus reconstructs the current picture based on the first residual coefficient and the second residual coefficient (S1560). The decoding apparatus may derive the residual samples for the current block based on the first residual coefficient and the second residual coefficient. For example, when the transform skip flag value for the current block is 1, the decoding apparatus may derive the residual samples by performing dequantization for the derived residual coefficients. Alternatively, when the transform skip flag value for the current block is 0, the decoding apparatus may perform dequantization for the derived residual coefficients and derive the residual samples by inverse-transforming the dequantized coefficients. In addition, the decoding apparatus may perform inter prediction or intra prediction for the current block based on the prediction information received through a bitstream and derive prediction samples and generate the reconstruction picture through addition of the prediction samples and the residual samples. Later, as occasion demands, in order to improve subjective/objective image quality, the in-loop filtering process such as deblocking filtering, SAO and/or ALF process may be applied to the reconstruction picture as described above.

Figure 16:
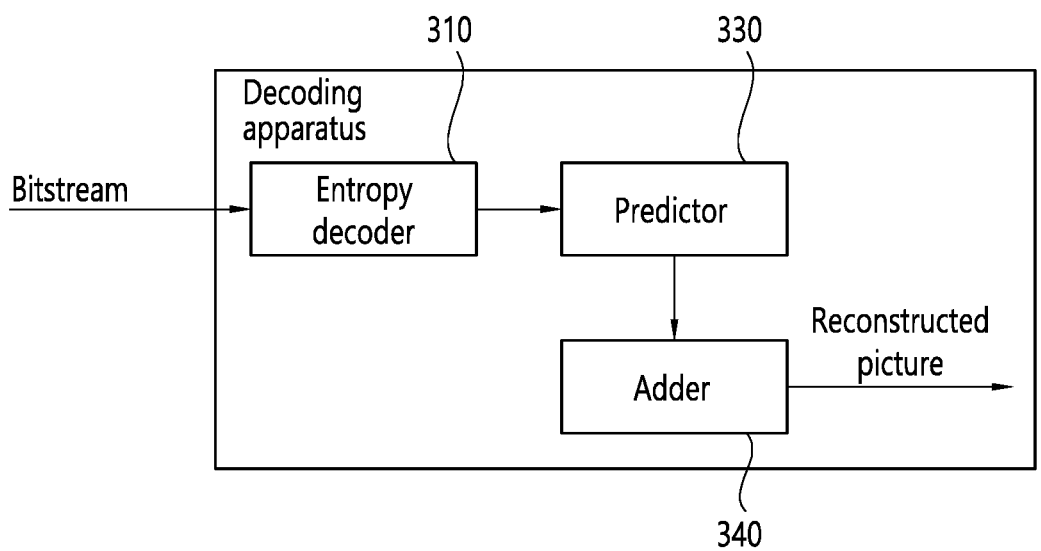
FIG. 16 schematically illustrates the decoding apparatus performing the image decoding method according to the present disclosure.

FIG. 16 schematically illustrates the decoding apparatus performing the image decoding method according to the present disclosure. The method shown in FIG. 15 may be performed by the decoding apparatus shown in FIG. 16. Particularly, for example, the entropy decoder of the decoding apparatus of FIG. 16 may perform steps S1500 to S1550 of FIG. 15, and the adder of the decoding apparatus of FIG. 16 may perform step S1560 of FIG. 15. In addition, although it is not shown, the process of deriving a prediction sample may be performed by the predictor of the decoding apparatus of FIG. 16.

According to the present disclosure, efficiency of residual coding may be improved.

In addition, according to the present disclosure, by considering that there is little correlation among residual coefficients of a pixel domain in which transform process is not performed, the process of deriving a rice parameter for binarizing residual coefficients may be simplified, and through this, residual coding efficiency may be improved.

The residual coefficients to which transform is not applied, different from the fact that the residual coefficients in a transform domain to which transform is applied have high correlation, may have insufficient correlation. Accordingly, in such a case, instead of deriving the Rice parameter for binarization based on a residual coefficient previously decoded, setting the Rice parameter as a fixed specific value, which may transmit information for the residual coefficients more efficiently.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in the present disclosure may be implemented and performed on a processor, a microprocessor, a controller or a chip. For example, functional units shown in each Figure may be implemented and performed on a computer, a processor, a micro-processor, a controller or a chip. In this case, information (ex. information on instructions) for implementation or algorithm may be stored in a digital storage medium.

In addition, the decoding apparatus and the encoding apparatus to which the embodiments of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a vehicle means terminal (e.g., vehicle terminal, airplane terminal, ship terminal, etc.) and a medical video apparatus and may be used to process video signals and data signals. For example, the OTT video apparatus may include a game console, a blu-ray player, an internet access TV, a home theater system, a smartphone, a tablet PC, a Digital Video Recorder (DVR), and the like.

Furthermore, the processing method to which the embodiments of the present disclosure are applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

In addition, the embodiment of the present disclosure may be implemented with a computer program product by program codes, and the program codes may be performed in a computer by the embodiment of the present disclosure. The program codes may be stored on a carrier readable by a computer.

Figure 17:
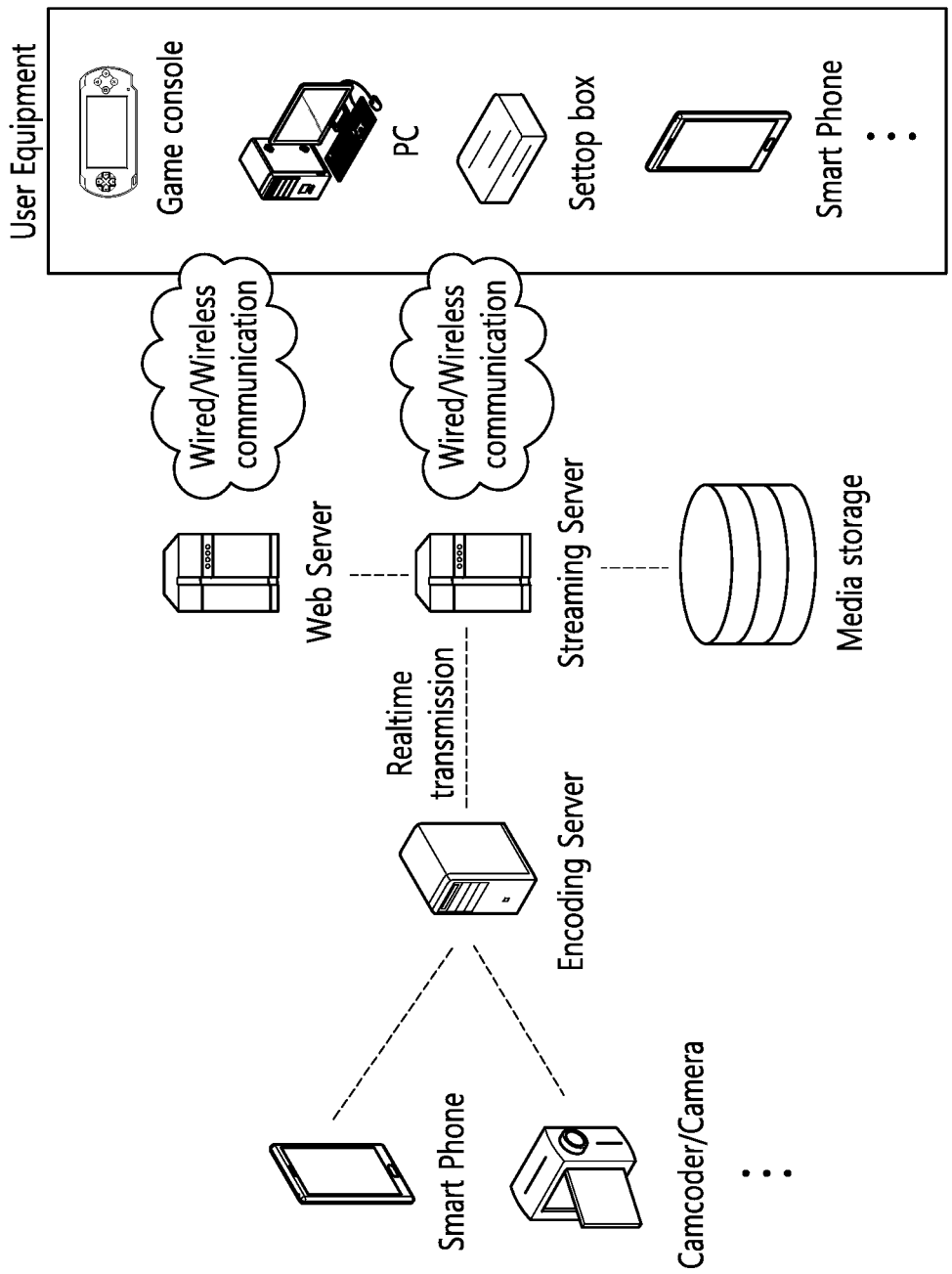
FIG. 17 illustrates a structure diagram of a content streaming system to which the embodiments of the present disclosure are applied.

FIG. 17 illustrates a structure diagram of a content streaming system to which the embodiments of the present disclosure are applied.

The content streaming system to which the embodiments of the present disclosure are applied may largely include an encoding server, a streaming server, a web server, a media storage, a user device, and a multimedia input device.

The encoding server compresses contents input from multimedia input devices including a smartphone, a camera, a camcorder, and the like, into digital data to serve to generate the bitstream and transmit the bitstream to the streaming server. As another example, when the multimedia input devices including the smartphone, the camera, the camcorder, and the like directly generate the bitstream, the encoding server may be omitted.

The bitstream may be generated by the encoding method or the bitstream generating method to which the embodiments of the present disclosure are applied, and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server, and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD), a digital Tv, a desktop computer, digital signage, and the like. Each server in the content streaming system may be operated as a distributed server, and in this case, data received by each server may be processed in distributed manner.

What is claimed is:

1. A decoding apparatus for image decoding, the decoding apparatus comprising:
a memory; and
at least one processor connected to the memory, the at least one processor configured to:
obtain image information including a transform skip flag, prediction information and residual information for a current block, wherein the transform skip flag is a flag for whether transform is applied to the current block and the residual information includes size related information for a residual coefficient of the current block;
derive a prediction sample of the current block based on the prediction information;
set a Rice parameter of the size related information to a specific value based on the transform skip flag;
derive available binary values for the size related information based on the Rice parameter;
derive a binary value of the size related information by decoding the size related information;
derive a value of the size related information by comparing the binary value and the available binary values;
derive the residual coefficient based on the value of the size related information;
derive a residual sample of the current block based on the residual coefficient; and
generate a reconstructed picture based on the prediction sample and the residual sample.

2. The decoding apparatus of claim 1, wherein based on a value of the transform skip flag being 1, the Rice parameter of the size related information is set equal to 1.

3. The decoding apparatus of claim 1, wherein the Rice parameter is set based on a size of the current block.

4. The decoding apparatus of claim 3, wherein based on the size of the current block being less than a specific size, the Rice parameter is set to 0, and
wherein based on the size of the current block being greater than or equal to the specific size, the Rice parameter is set to 1.

5. The decoding apparatus of claim 3, wherein based on a sample number of the current block being less than 256, the Rice parameter is set to 1, and
wherein based on the sample number of the current block being greater than or equal to 256, the Rice parameter is set to 2.

6. The decoding apparatus of claim 1, wherein the Rice parameter is set based on a ratio between a width and a height of the current block.

7. The decoding apparatus of claim 6, wherein based on the ratio between the width and the height of the current block being greater than 2 and less than ½, the Rice parameter is set to 0, and
wherein based on the ratio between the width and the height of the current block being ½ or more and 2 or less, the Rice parameter is set to 1.

8. An encoding apparatus for image encoding, the encoding apparatus comprising:
a memory; and
at least one processor connected to the memory, the at least one processor configured to:
derive a transform skip flag for a current block, wherein the transform skip flag is a flag for whether transform is applied to the current block;
derive a prediction sample of the current block;
derive prediction information for the prediction sample;
derive a residual coefficient of the current block;
set a Rice parameter for the residual coefficient to a specific value based on the transform skip flag;
derive a binary value for size related information for the residual coefficient based on the Rice parameter; and
derive residual information including the size related information by encoding the binary value for the size related information; and
generate a bitstream including the transform skip flag, the prediction information and the residual information.

9. The encoding apparatus of claim 8, wherein based on a value of the transform skip flag being 1, the Rice parameter of the size related is set equal to 1.

10. An apparatus for transmitting data for an image, the apparatus comprising:
at least one processor configured to obtain the bitstream of the image information including residual information, wherein the bitstream is generated by deriving a transform skip flag for a current block, wherein the transform skip flag is a flag for whether transform is applied to the current block, deriving a prediction sample of the current block, deriving prediction information for the prediction sample, deriving a residual coefficient of the current block, setting a Rice parameter for the residual coefficient to a specific value based on the transform skip flag, deriving a binary value for size related information for the residual coefficient based on the Rice parameter, deriving residual information including the size related information by encoding the binary value for the size related information and generating the bitstream including the transform skip flag, the prediction information and the residual information; and
a transmitter configured to transmit the data comprising the bitstream of the image information including the residual information.

* * * * *